(12) United States Patent
Ejima et al.

(10) Patent No.: US 7,088,865 B2
(45) Date of Patent: Aug. 8, 2006

(54) IMAGE PROCESSING APPARATUS HAVING IMAGE SELECTION FUNCTION, AND RECORDING MEDIUM HAVING IMAGE SELECTION FUNCTION PROGRAM

(75) Inventors: Satoshi Ejima, Setagaya-ku (JP); Hirotake Nozaki, Koutou-ku (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 11/042,068

(22) Filed: Jan. 26, 2005

(65) Prior Publication Data

US 2005/0219666 A1    Oct. 6, 2005

Related U.S. Application Data

(63) Continuation of application No. 09/443,293, filed on Nov. 19, 1999, now abandoned.

(30) Foreign Application Priority Data

| Nov. 20, 1998 | (JP) | ................................. 10-31367 |
| Jan. 18, 1999 | (JP) | ................................. 11-9077 |
| Jan. 18, 1999 | (JP) | ................................. 11-9078 |
| Jan. 18, 1999 | (JP) | ................................. 11-9079 |
| Jan. 18, 1999 | (JP) | ................................. 11-9080 |

(51) Int. Cl.
  *G06K 9/36*    (2006.01)
(52) U.S. Cl. ........................ 382/232; 382/286; 382/307
(58) Field of Classification Search ................ 382/232, 382/254, 286–290, 307–308, 274–275
  See application file for complete search history.

(56) References Cited

U.S. PATENT DOCUMENTS

| 5,043,816 | A | 8/1991 | Nakano et al. |
| 5,111,306 | A | 5/1992 | Kanno et al. |
| 5,359,382 | A | 10/1994 | Uenaka |
| 5,359,676 | A | 10/1994 | Fan |
| 5,479,211 | A | 12/1995 | Fukuda |
| 5,594,554 | A | 1/1997 | Farkash et al. |
| 5,842,059 | A | 11/1998 | Suda |
| 6,125,201 | A | 9/2000 | Zador |
| 6,415,057 | B1 | 7/2002 | Suzuki et al. |
| 6,697,529 | B1 | 2/2004 | Kuniba |
| 2003/0193610 | A1 | 10/2003 | Nozaki et al. |

FOREIGN PATENT DOCUMENTS

| JP | A-4-220879 | 8/1992 |
| JP | A-11-136557 | 5/1999 |

*Primary Examiner*—Thomas D. Lee
*Assistant Examiner*—Stephen Brinich
(74) *Attorney, Agent, or Firm*—Oliff & Berridge, PLC

(57) ABSTRACT

An image processing apparatus having an image selecting function, includes: an evaluation device that takes in a plurality of sets of image data of a subject obtained through image-capturing and performs acceptability evaluation on each of the plurality of sets of image data; and an acceptability selection device that selects image data ranked high in the acceptability evaluation among the plurality of sets of image data having undergone the acceptability evaluation performed at the evaluation device.

3 Claims, 24 Drawing Sheets

PHOTOMETRIC AREAS

FOCAL POINT DETECTION AREAS

WEIGHTING AT PERIPHERY OF EVALUATION AREA

PHOTOGRAPHING ORDER DISPLAY MODE

EVALUATION RANK ORDER DISPLAY MODE

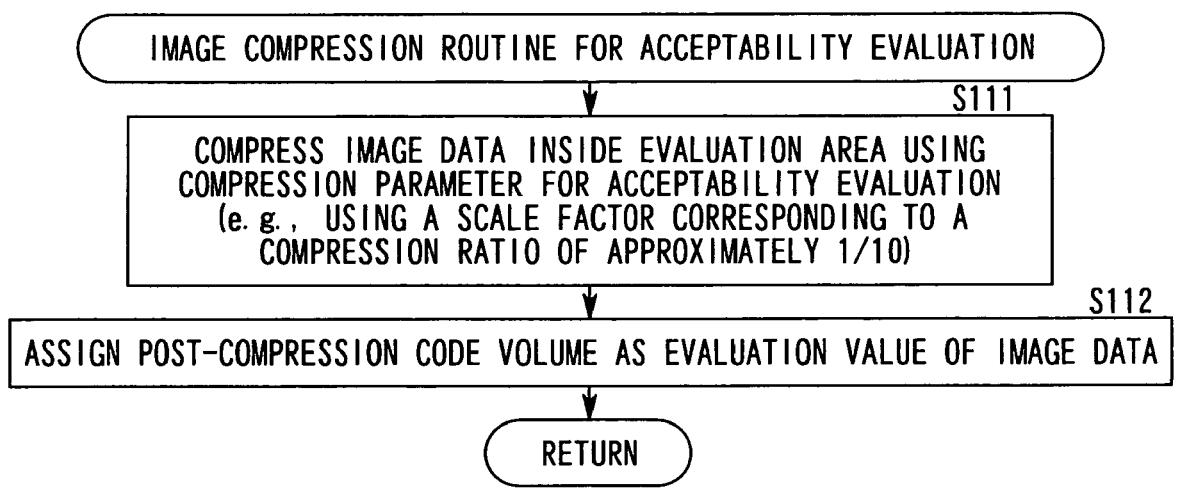
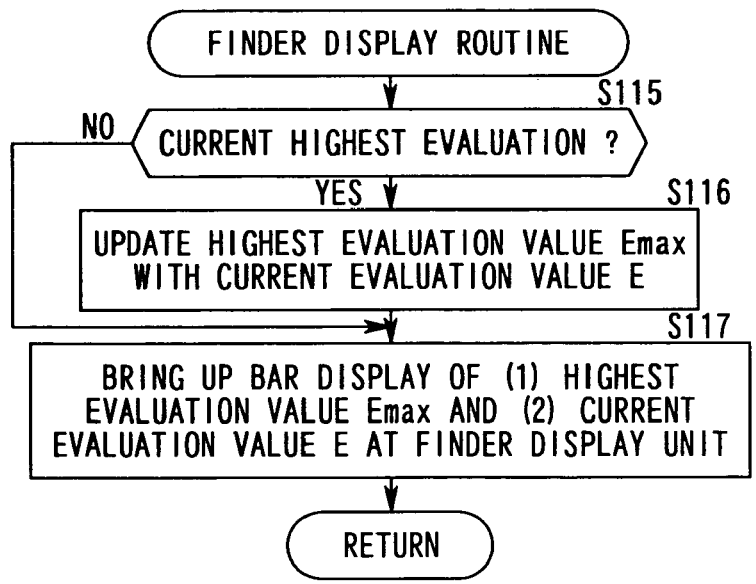

IMAGE PROCESSING APPARATUS HAVING IMAGE SELECTION FUNCTION, AND RECORDING MEDIUM HAVING IMAGE SELECTION FUNCTION PROGRAM

This is a Continuation of application Ser. No. 09/443,293 filed Nov. 19, 1999 now abandoned. The entire disclosure of the prior application is hereby incorporated by reference herein in its entirety.

INCORPORATION BY REFERENCE

The disclosures of the following priority applications are herein incorporated by reference:
Japanese Patent Application No. 10-331367 Nov. 20, 1998
Japanese Patent Application No. 11-009077 Jan. 18, 1999
Japanese Patent Application No. 11-009078 Jan. 18, 1999
Japanese Patent Application No. 11-009079 Jan. 18, 1999
Japanese Patent Application No. 11-009080 Jan. 18, 1999
The disclosures of U.S. Pat. No. 5,594,554, Japanese Patent Application No. 10-284531 and Japanese Patent Application No. 10-236102 are herein incorporated by reference.

BACKGROUND OF THE INVENTION

1. Field of the Invention

The present invention relates to an image processing apparatus for selecting image data obtained in a good photographing state and image data achieving a good image quality for storage, and a recording medium having a program recorded therein.

2. Description of the Related Art

Normally, blurring occurring due to unsteady hands tends to occur when taking pictures by holding the camera by hand. When such blurring resulting from camera vibration by hand tremble, the photographic field is moving during exposure, which results in a photographed image that is, on the whole, blurry. In such a blurry image, fine details become lost over the entire image plane, and edges that should be clearly defined become dull. Thus, the resulting image is entirely unsatisfactory.

To provide a solution to problems caused by such camera vibration there are cameras having a camera vibration correction mechanism in the known art. FIG. 25 illustrates a camera of this type, having a camera vibration correction mechanism. In FIG. 25, a taking lens 92 is mounted at the front surface of a camera 91. Inside the lens barrel of the taking lens 92, a camera vibration correction optical system 93 is rotatably provided.

The rotations of two shafts of two coreless motors 94 and 95 are communicated to the camera vibration correction optical system 93, to cause it to vibrate in the vertical and horizontal directions. In addition, a camera vibration quantity detection sensor 96 that detects the quantity of camera vibration in the horizontal direction and a camera vibration quantity detection sensor 97 that detects the quantity of camera vibration in the vertical direction are provided in the camera 91. In the camera 91 structured as described above, the vibration of the main body of the camera 91 is detected by the camera vibration quantity detection sensors 96 and 97. The camera 91 drives the coreless motors 94 and 95 in the directions opposite from the directions of the detected vibration to cause the optical axis of the camera vibration correction optical system 93 to vibrate. As a result, the vibration of the photographing optical axis is canceled out so that a good photograph with the camera vibration corrected is taken.

However, there is a problem in the example of the prior art described above in that the camera vibration correction optical system 93 must be provided in the taking lens 92 which becomes, therefore, large and heavy. In addition, since only camera vibration is corrected in this example of the prior art, any degradation in image quality caused by the blurring of a moving subject or by poor focus cannot be prevented.

SUMMARY OF THE INVENTION

An object of the present invention is to provide an image processing apparatus that selects image data obtained in a good photographing state and achieving a high image quality for storage.

In order to achieve the object described above, an image processing apparatus according to the present invention having an image selecting function, comprises: an evaluation device that takes in a plurality of sets of image data of a subject obtained through image-capturing and performs acceptability evaluation on each of the plurality of sets of image data; and an acceptability selection device that selects image data ranked high in the acceptability evaluation among the plurality of sets of image data having undergone the acceptability evaluation performed at the evaluation device.

In this image processing apparatus, preferably, the plurality of sets of image data are obtained through continuous image-capturing at predetermined time intervals.

Also, preferably, the acceptability selection device records the selected image data into a recording medium.

In the structure described above, the image-capturing device engages in continuous image-capturing to obtain image data corresponding to a plurality of frames in a single photographing operation. The evaluation device evaluates individual sets of such image data with respect to whether the photographing state is good or bad or whether the image quality is good or bad. The acceptability selection device selectively stores good image data that have been ranked high in the evaluation by the evaluation device. Through this operation, image data generated in a good photographing state can be selectively acquired according to the present invention.

An image processing apparatus according to the present invention having an image selecting function, comprises: an evaluation device that takes in a plurality of sets of image data obtained through continuous image-capturing and performs acceptability evaluation on each of the plurality of sees of image data within an evaluation area set to occupy a portion of an image plane; and an acceptability selection device that selects image data ranked high in the acceptability evaluation among the plurality of sets of image data having undergone the acceptability evaluation performed at the evaluation device and records the image data into a recording medium.

In this image processing apparatus, preferably, the evaluation device sets evaluation weighting toward a periphery of the evaluation area lower than an evaluation weighting at a central portion of the evaluation area.

Also, preferably, a plurality of evaluation areas are set at a plurality of locations within the image plane; and the evaluation device performs integrated evaluation of acceptability of image data based upon individual evaluations performed in the evaluation areas.

Also, the image processing apparatus preferably further comprises an area setting device that selects an evaluation area or selects and changes weighting of evaluation areas.

In the image processing apparatus provided with this evaluation device, preferably, the area setting device selects an evaluation area by excluding light areas and dark areas in the image plane or by setting evaluation weighting for light areas and dark areas at a relatively low level.

Also, preferably, the area setting device selects an evaluation area by selecting an area that is in a focus-verified state in the image plane or by setting evaluation weighting for the area that is in a focus-verified state at a relatively high level.

Also, preferably, the image processing apparatus further comprises an image-capturing device that continuously captures images of a subject and the area setting device is also utilized to select a photometric area for the image-capturing device, and in correspondence to either the photometric area or the evaluation area that is determined first, the other area is determined. In this case, preferably, the image processing apparatus further comprises a lock device that fixes exposure adjustment in response to an external operation, and the area setting device clears or re-sets the evaluation area when the lock device has fixed the exposure adjustment.

Also, preferably, the image processing apparatus further comprises an image-capturing device that continuously captures images of a subject and the area setting device is also utilized to select a focal point detection area for the image-capturing device, and in correspondence to either the focal point detection area or the evaluation area that is determined first, the other area is determined. In this case, preferably, the image processing apparatus further comprises a lock device that fixes focal adjustment in response to an external operation, and the area setting device clears or re-sets the evaluation area when the lock device has fixed the focal adjustment.

In the structure described above, the acceptability evaluation made by the evaluation device is executed in a limited evaluation area which is set over a portion of the image plane. Thus, there is no risk of the acceptability evaluation being affected by blurring in the background image outside the area, thereby making it possible to perform the acceptability evaluation of the image data in an even more accurate manner. In addition, since the evaluation area is limited, the length of time required for the acceptability evaluation can be reduced.

Generally speaking, when a camera vibration or a subject-motion occurs, the surrounding image may temporarily jump into the periphery of the evaluation area (hereafter, an image that jumps into the evaluation area in this manner is referred to as a "jump image"). If such jump images are present in a plurality of sets of image data, the acceptability evaluation cannot be performed under the same conditions for all the image data, and thus, the comparative selection of image data performed at the acceptability selection device becomes slightly inaccurate. However, in the structure described above, the evaluation weighting toward the periphery of the evaluation area is set lower compared to the evaluation weighting at the central portion of the evaluation area. Consequently, the degree to which such a jump image affects the value representing the results of the acceptably evaluation is greatly reduced, thereby making it possible to perform comparative selection of image data at the acceptability selection device with an even higher degree of accuracy.

When there are a plurality of subjects present in the photographic image plane, it is desirable to perform an integrated acceptability evaluation for all these subjects to achieve more accurate image evaluation. Accordingly, in the structure described above, a plurality of evaluation areas are set within the image plane and an integrated evaluation is performed using the individual evaluations performed in the plurality of the evaluation areas for the acceptability evaluation of the image data. As a result, accurate acceptability evaluation that is appropriate for a situation in which there are a plurality of subjects present in the photographic image plane is realized.

It is to be noted that examples of the arithmetic operation performed to achieve such an integrated evaluation include weighted addition, majority operation, maximum value operation and minimum value operation. In addition, by simply combining these arithmetic operations or combining them conditionally, more complex and precise integrated evaluation can be achieved. The following is an explanation of individual functions and advantages of these examples of arithmetic operations.

(Integrated Evaluation Achieved Through Weighted Addition of Individual Evaluations)

For instance, the evaluation weighting for the evaluation area at the center of the image plane may be set high while setting the evaluation weighting for the evaluation area in the periphery of the image plane to a low value so that the focus of the evaluation is set on the center of the image plane. Thus, through weighted addition, the evaluation balance among the individual evaluation areas can be adjusted in a flexible and simple manner.

(Integrated Evaluation Achieved Through Majority Operation Performed on Individual Evaluations)

In a majority operation, the results of the evaluation of the individual evaluation areas are classified into a plurality of levels (e.g., "very good," "good," "medium" and "poor"). Based upon the results of such classification, the evaluation level applied to the greatest number of evaluation areas is determined to be the evaluation value of the image data obtained through the majority operation. Such a majority operation minimizes the degree to which minority evaluations occurring only in part or occurring accidentally affect the overall evaluation to make it possible to achieve an accurate, integrated evaluation.

(Integrated Evaluation Achieved Through Maximum Value Operation of Individual Evaluations)

In a maximum value operation, the evaluation achieving the highest rank among the evaluations of the individual evaluation areas is used as the integrated evaluation of the image data. Under normal circumstances, it is difficult to achieve an accurate acceptability evaluation if a large portion of the image plane is intentionally left blur and, at the same time, the subject image is positioned in one of the evaluation areas. However, by executing the maximum value operation under these conditions, the inappropriately low evaluation on an undefined background or the like can be eliminated with a high degree of reliability in a simple manner. Furthermore, a relatively high evaluation of the subject image located in one of the evaluation areas can be automatically extracted.

(Integrated Evaluation Achieved Through Minimum Value Operation of Individual Evaluations)

In a minimum value operation, the evaluation ranked lowest among the evaluations of the individual evaluation areas is extracted as the integrated evaluation of the image data. Thus, the acceptability selection device selects image data based upon comparison of the lowest evaluations of the individual sets of image data. As a result, the acceptability selection device selects and stores image data achieving the highest rank among the low evaluations. For this reason, the minimum value operation described above is ideal in a situation in which it is necessary to photograph the entire image plane in the best possible manner rather than a specific subject, e.g., when photographing a group picture or a landscape.

By adding an area setting device in the structure described above, the evaluation area setting can be varied freely without restricting the evaluation area selection and the weighting of the evaluation areas to fixed settings. It is to be noted that specific examples of the operating device for such setting adjustment include input devices of the known art such as a sight line input mechanism, a command dial, a mouse and a cross button as well as the semiautomatic adjustment device described above.

As a general rule, exposure performed at an image processing apparatus (for example an electric camera) under certain conditions may result in the brightness level becoming collapsed in the light areas and the dark areas within the image plane. The evaluation device according to the present invention is capable of precisely detecting such a collapse in the brightness level as, for instance, a reduction in the high spatial frequency component. As a result, it becomes possible to select and store image data with a reduced degree of collapse in the brightness level achieving rich gradation over the entire range of brightness as good image data.

However, there are situations in which a collapse in the brightness level in a light area or a dark area cannot be avoided, as in a photographing operation performed under bright sun in midsummer. Under such circumstances, a problem of image data being evaluated inappropriately low due to such a collapse in the brightness level may arise. As a solution to this problem, according to the present invention evaluation areas are set by the area setting device by ensuring that the degree of influence of the light area or dark area within the image plane is reduced. As a result, it is possible to prevent an inappropriate evaluation from being made due to the brightness collapse described above. In addition, in a normal photographing environment, it is highly likely that the image of the subject to be photographed is located in a roughly central brightness area of the image plane. For this reason, it is naturally highly likely that the subject image is present in an evaluation area set as described above, which makes it possible to execute acceptability evaluation of the subject image with a high degree of certainty.

Normally, it is very likely that the image of a subject to be photographed is located within an area that is in a focus-verified state. Since mainly areas in such a focus-verified state are set as evaluation areas according to the present invention, acceptability evaluation of the subject image can be executed with a high degree of accuracy.

Under normal circumstances, it is highly likely that the image of a subject to be photographed is located inside an area that has been manually or automatically selected as a photometric area. Thus, by ascertaining the correlation between the photometric areas and the evaluation areas, it is possible to efficiently and quickly determine either a photometric area or an evaluation area in correspondence to the other. In addition, since a single area setting device can be utilized for setting both types of areas, that portion of the structure of the image processing apparatus that is involved in the setting of the two types of areas can be further simplified.

Normally, it is highly likely that the image of a subject to be photographed is located in an area that has been manually or automatically selected as a focal point detection area. Consequently, by ascertaining the correlation between the focal point detection areas and the evaluation areas, it is possible to efficiently and quickly determine either a focal point detection area or an evaluation area in correspondence to the other. In addition, since a single area setting device can be utilized for setting both types of areas, that portion of the structure of the image processing apparatus that is involved in the setting of the two types of areas can be further simplified.

When the photographer has fixed the focal adjustment or the exposure adjustment via a locking device, he is likely to change the image plane layout by changing the direction in which the image-capturing device faces prior to photographing. When the image plane layout is changed in this manner, it is likely that the subject is not present inside any of the evaluation areas set in advance, which results in a lower degree of reliability in the results of the acceptability evaluation. In order to solve this problem, the image processing apparatus described above clears the evaluation area setting or resets a new evaluation area when the focal adjustment or the exposure adjustment has been fixed, to avoid any reduction in the degree of reliability in a timely manner.

Another image processing apparatus having an image selecting function, comprises: an image-capturing device that continuously captures images of a subject; an evaluation device that takes in a plurality of sets of image data obtained at the image-capturing device through continuous image-capturing and performs acceptability evaluation on each of the plurality of sets of image data; an acceptability selection device that selects image data ranked high in the acceptability evaluation among the plurality of sets of image data having undergone the acceptability evaluation performed at the evaluation device and records the image data into a recording medium; and a frame number changing device that changes a number of frames over which continuous image-capturing is performed at the image-capturing device.

In this image processing apparatus, preferably, the frame number changing device stops a continuous image-capturing operation performed by the image-capturing device when an evaluation made by the evaluation device indicates one of a value greater than a specific upper limit value, a value less than a specific lower limit value and a relative maximum value.

Also, preferably, the image processing apparatus further comprises a framing detection device that detects a framing change at the image-capturing device, and the frame number changing device stops a continuous image-capturing operation by the image-capturing device when the framing change is detected by the framing detection device.

Also, preferably, the frame number changing device allows a continuous image-capturing operation to be resumed at the image-capturing device when none of evaluations made by the evaluation device reach a specific threshold value.

Since a frame number changing device is provided in the present invention, the number of frames for a continuous image-capturing operation performed by the image-capturing device can be varied in a flexible manner in correspondence to the specific photographing states, the photographing skills of the photographer and the like.

Generally speaking, the quality of image that can be achieved through image-capturing is greatly affected by the photographing conditions and the image-capturing skills of the photographer. Thus, if the number of frames for continuous image-capturing is fixed in advance, a problem occurs in that the number of frames is not sufficient to capture a good quality image or the number of frames is too large so that there is an excess resulting in an overly long photographing time. However, in the structure described above, the evaluation made by the evaluation device is monitored and, depending upon the results of the evaluation, continuous image-capturing is automatically stopped. Consequently, the number of frames is automatically adjusted in correspondence to the photographing state, the photographing skills of the photographer and the like, to solve the problem described above.

When there is a change in the framing resulting from the subject moving out of the image plane or the like, the composition of continuous image data changes in the middle. If the composition changes in the middle in this manner, it is difficult to perform acceptability evaluation based upon the same conditions, and ultimately, accurate comparison of a series of sets of image data cannot be performed for appropriate selection. In addition, the photographer may lose interest in the subject and may decide to intentionally change the framing by lowering the camera or the like. According to the present invention, such a change in the framing is detected to stop continuous image-capturing. Consequently, continuous image-capturing is not sustained to no purpose and is stopped rationally.

Situations in which no good image data are obtained after a continuous image-capturing operation is completed should be expected to arise occasionally. In such a case, the task of comparing image data and selecting a good image among them itself is meaningless. Thus, according to the present invention, if none of the evaluations made at the evaluation device reaches a preset threshold value, the continuous image-capturing operation is performed again. By performing such an operation, it becomes possible to achieve a comparative selection for a good image while assuring that good image data have been obtained through image-capturing with a high degree of certainty.

An image processing apparatus according to the present invention having an evaluation display function, comprises: an evaluation device that takes in a plurality of sets of image data obtained through continuous image-capturing and performs acceptability evaluation on each of the plurality of sets of image data; a display device that displays image data together with evaluations of the image data made by the evaluation device; a selection operation device that accepts an external image selection operation that is performed to select one set of image data among the image data brought up on the display device; and a selection recording device that records the image data selected via the selection operation device into a recording medium.

In the structure described above, the image-capturing device performs continuous image-capturing to obtain image data corresponding to a plurality of frames in a single photographing operation. The evaluation device evaluates the acceptability of the photographing state, the acceptability of the image quality or the like for individual sets of such image data. The selection operation device displays both the image data and the results of the acceptability evaluations. The photographer engages in an image selection operation by referring to the display to accurately select image data obtained in a good photographing state for storage.

Another image processing apparatus having an evaluation display function, comprises: an evaluation device that takes in a plurality of sets of image data obtained through continuous image-capturing and performs acceptability evaluation on each of the plurality of sets of image data; a display device that displays a plurality of sets of image data in a order of evaluation rankings in the acceptability evaluation made by the evaluation device; a selection operation device that accepts an external image selection operation that is performed to select one set of image data among the image data brought up on the display device; and a selection recording device that records the image data selected via the selection operation device into a recording medium.

In the structure described above, the image-capturing device performs continuous image-capturing to obtain image data corresponding to a plurality of frames in a single photographing operation. The evaluation device evaluates the acceptability of the photographing state, the acceptability of the image quality or the like for individual sets of such is image data. The selection operation device displays the image data in the order of rankings in the acceptability evaluation. The photographer engages in an image selection operation by referring to the display to accurately select image data obtained in a good photographing state for storage.

Another image processing apparatus having an evaluation display function, comprises: an evaluation device that performs acceptability evaluation on image data obtained through image-capturing; and a display device that displays an image based upon the image data together with the evaluation made by the evaluation device.

In this image processing apparatus, preferably, the display device displays a highest evaluation made by the evaluation device together with a most recent evaluation made by the evaluation device.

In the structure described above, the acceptability of the photographing state at image-capturing is displayed on the display device (monitor). Thus, the photographer can refer to the display on the display device to correct the photographing state for subsequent photographing toward a more desirable result with ease. It is to be noted that the structure described above, in which image-capturing may be performed intermittently, is capable of performing a standard image-capturing operation in which pictures are taken one frame at a time. During such an image-capturing operation, too, the photographer can correct the photographing state for a subsequent photographing operation for a better result with ease by referring to the results of the evaluation of the preceding frame in a similar manner.

In the structure described above, the photographer can easily correct the photographing state for subsequent photographing toward a better result by comparing the highest evaluation and the most recent evaluation.

Another image processing apparatus having an image selecting function, comprises: a compression device that engages in compression processing on image data; an evaluation device that controls the compression device to compresses a plurality of sets of image data obtained through continuous image-capturing by using a compression parameter for acceptability evaluation and performs acceptability evaluation on each set of image data based upon a resulting post-compression code volume; and an acceptability selection device that selects image data ranked high in the acceptability evaluation among the plurality of sets of image data having undergone the acceptability evaluation at the acceptability evaluation device and records the selected image data into a recording medium in a state in which the selected image data are compressed via the compression device to achieve a target post-compression code volume for image recording.

In this image processing, preferably, the acceptability selection device makes a decision as to whether or not a post-compression code volume of the image data that have been selected, achieved in the acceptability evaluation is within an allowable range for a target post-compression code volume for image recording, and records compressed data resulting from the acceptability evaluation if the post-compression code volume is within the allowable range, but re-compresses the image data that have been selected to achieve the target post-compression volume for image recording and records the re-compressed image data if the post-compression code volume is not within the allowable range.

Also, preferably, the compression device determines a compression parameter to be used for re-compression to achieve the target post-compression volume for image recording based upon results of the compression processing performed during the acceptability evaluation.

In the structure described above, the evaluation device employs a compression device to compress the image data using a compression parameter for the acceptability evaluation (the parameter used in a compression arithmetic operation that determines the compression ratio) for the individual sets of image data. Since image data obtained through continuous image-capturing normally have similar picture compositions, the post-compression code volumes are approximately equal to one another among these images. However, if camera vibration blur, the subject-motion blur or blur caused by poor focus or the like occurs in some image data, the high frequency component in the spatial frequency dissipates, thereby correspondingly reducing the post-compression code volume. Thus, the evaluation device evaluates data with a greater post-compression code volume as better quality image data. The acceptability selection device selects better quality image data in conformance to such an evaluation criterion and records them.

Through the operation described above, image data obtained in a good photographing state can be selectively stored according to the present invention. In particular, the compression device which is normally employed for recording is utilized to execute the processing for acceptability evaluation. Consequently, a separate processing mechanism dedicated to acceptability evaluation is not required, achieving simplification of the apparatus structure.

In addition, according to the present invention, a special compression parameter that is not used for recording is used for image compression for the acceptability evaluation. Under normal circumstances, if the compression factor setting for recording is extremely high, a great quantity of the high frequency component in the spatial frequency is lost during the compression stage, causing the post-compression code volume to vary little among different images. If, on the other hand, the compression factor setting for recording is extremely low, very small amplitude signals such as dark current noise and fixed pattern noise become coded (quantized) as high frequency components. Consequently, in this case, too, the post-compression code volumes do not greatly vary among different images.

The phenomena described above may result in difficulty in performing acceptability evaluation since no significant differences manifest among the post-compression code volumes if the acceptability evaluation is performed using the results of the image compression implemented during the recording operation. However, according to the invention described above, a special compression parameter is used for the acceptability evaluation. As a result, it is possible to set the compression factor in the medium range, which is suitable for the acceptability evaluation, separately from the compression factor for recording. Thus, accurate acceptability evaluation can be executed with a high degree of reliability independently of the compression factor setting for recording.

According to the present invention, if the code volume of compressed data having undergone acceptability evaluation is appropriate for recording, the compressed data are recorded. Consequently, the recompression processing for recording can be omitted to achieve a reduction in the length of time required to implement the overall processing.

Under normal circumstances, several trial compressions must be performed and the compression parameter must be corrected in order to ensure that the post-compression code volume for recording is set within a target range. However, according to the present invention, the results of the compression performed during the acceptability evaluation constitutes a trial compression so that the number of trial compressions that need to be performed for recording can be reduced with a high degree of reliability.

Another image processing apparatus according to the present invention comprises: an image-capturing device that captures an image of a subject; a recording device that records image data obtained through image-capturing performed by the image-capturing device; a photographic evaluation device that evaluates acceptability of a photographing state in which the image data have been obtained through image-capturing performed by the image-capturing device; a mode setting device that, in response to an external operation, sets or clears (1) an acceptability selection mode in which image data with a high evaluation from the photographic evaluation device among image data obtained through continuous image-capturing performed by the image-capturing device are selectively recorded and (2) a continuous shooting mode in which image data corresponding to a plurality of frames obtained through continuous image-capturing performed by the image-capturing device are all recorded, to determine a photographing sequence that corresponds to a current mode setting; and a photographic control device that implements control on the image-capturing device and the recording device in conformance to the photographing sequence determined by the mode setting device and executes photographing. And the mode setting device implements control of setting to ensure that even if an instruction is issued through an external operation for a setting whereby the acceptability selection mode and the continuous shooting mode overlap each other the acceptability selection mode and the continuous shooting mode do not overlap in setting.

In this image processing apparatus, preferably, the mode setting device implements control to ensure that if an external operation is performed to set either the continuous shooting mode or the acceptability selection mode while the other mode is set, the external operation is not accepted.

Also, preferably, the mode setting device implements control to ensure that if the continuous shooting mode and the acceptability selection mode are set overlapping each other, either mode that has been set earlier is automatically cleared. In this case, preferably, the mode setting device reverts to the mode set earlier and automatically cleared, if an external operation clears over lapping of mode settings.

Another image processing apparatus according to the present invention comprises: an image-capturing device that captures an image of a subject; a recording device that records image data obtained through image-capturing performed by the image-capturing device; a photographic evaluation device that evaluates acceptability of a photographing state in which the image data have been obtained through image-capturing performed by the image-capturing device; a mode setting device that, in response to an external operation, sets or clears (1) an acceptability selection mode in which image data with a high evaluation from the photographic evaluation device among image data obtained through continuous image-capturing performed by the image-capturing device are selectively recorded and (2) a continuous shooting mode in which image data corresponding to a plurality of frames obtained through continuous image-capturing performed by the image-capturing device are all recorded, to determine a photographing sequence that corresponds to a current mode setting; and a photographic control device that implements control on the image-capturing device and the recording device in conformance to the photographing sequence determined by the mode setting device and executes photographing. And the photographic control device executes a photographing sequence selected in correspondence to a mode given higher priority in conformance to a predetermined priority order even if the acceptability selection mode and the continuous shooting mode are set overlapping each other through an external operation.

Normally, when an acceptability selection mode and a continuous shooting mode are set at the same time, an acceptability selection operation is executed for the individual frames photographed through the continuous shooting operation (image-capturing for a plurality of frames→acceptability selection), thereby causing a problem of a serious reduction in the continuous shooting speed. As a solution, in the structure described above, one of (B1)~(B3) below is implemented as a device to ensure that the acceptability selection mode and the continuous shooting mode are prevented from being set at the same time.

(B1) Prohibition of Acceptance of an External Operation

The mode setting device prohibits (rejects, disregards or invalidates) acceptance of an external operation if the acceptability selection mode and the continuous shooting mode overlap. As a result, the continuous shooting mode cannot be set after the acceptability selection mode has been set. Likewise, the acceptability selection mode cannot be set in a state in which the continuous shooting mode is already set. Thus, the acceptability selection mode and the continuous shooting mode are never set concurrently, thereby eliminating problems caused by the two modes being used at the same time with a high degree of reliability. In particular, during such an operation, the acceptance of an external operation is prohibited at the point in time at which the external operation is attempted by the photographer. This prompts awareness on the part of the photographer that these modes cannot be set at the same time.

(B2) Automatic Clearing of Either Mode

The mode setting device automatically (forcibly) clears at least one of the modes when the acceptability selection mode and the continuous shooting mode overlap. This ensures that the acceptability selection mode and the continuous shooting mode are never set at the same time, thereby eliminating problems caused by the two modes being used together with a high degree of reliability. In particular, during such an operation, by giving priority to the mode to be set anew and automatically clearing the mode that was previously set, the most recent photographing intention of the photographer can be accurately reflected in the mode setting of the image processing apparatus. In addition, in this case, the photographer is not required to clear the previous mode that was set before any problems occur due to the setting of the new mode. As a result, the operability in mode setting further improves. Moreover, during such an operation, by fixing one specific mode as the mode to be automatically cleared regardless of the sequence of external operations, the priority order of the modes can be determined in advance. For is instance, by setting the acceptability selection mode as the mode to be automatically cleared when the acceptability selection mode and the continuous shooting mode overlap, the continuous shooting mode can be given priority over the acceptability selection mode for execution at all times.

(B3) Photographing Sequence Unaffected by Mode Setting

The mode setting device ensures that when the acceptability selection mode and the continuous shooting mode overlap, the state in which these modes are set concurrently is not reflected in the photographing sequence. Thus, even if the two modes are set at the same time, the photographing sequence in the acceptability selection mode and the photographing sequence in the continuous shooting mode are not executed simultaneously, thereby eliminating problems resulting from the two modes being used at the same time with a high degree of reliability. This may be achieved by determining the priority order of the modes in advance and by executing the mode given higher priority first.

Another image processing apparatus according to the present invention comprises: an image-capturing device that captures an image of a subject; a recording device that records image data obtained through image-capturing performed by the image-capturing device; a photographic evaluation device that evaluates acceptability of a photographing state in which the image data have been obtained through image-capturing performed by the image-capturing device: a mode setting device that, in response to an external operation, sets or clears (1) an acceptability selection mode in which image data with a high evaluation from the photographic evaluation device among image data obtained through continuous image-capturing performed by the image-capturing device are selectively recorded and (2) a light emission mode in which light emission is performed automatically or unconditionally by controlling an external or internal flash unit at image-capturing by the image-capturing device, to determine a photographing sequence that corresponds to a current mode setting; and a photographic control device that implements control on the image-capturing device and the recording device in conformance to the photographing sequence determined by the mode setting device and executes photographing. And the mode setting device implements control of setting to ensure that even if an instruction is issued through an external operation for a setting whereby the acceptability selection mode and the light emission mode overlap each other the acceptability selection mode and the continuous shooting mode do not overlap in setting.

In this image processing apparatus, preferably, the mode setting device implements control to ensure that if an external operation is performed to set either the light emission mode or the acceptability selection mode while the other mode is set, the external operation is not accepted.

Also, preferably, the mode setting device implements control to ensure that if the light emission mode and the acceptability selection mode are set overlapping each other, either mode that has been set earlier is automatically cleared. In this case, preferably, the mode setting device reverts to the mode set earlier and automatically cleared, if an external operation clears-overlapping of mode settings.

Another image processing apparatus according to the present invention comprises: an image-capturing device that captures an image of a subject; a recording device that records image data obtained through image-capturing performed by the image-capturing device; a photographic evaluation device that evaluates acceptability of a photographing state in which the image data have been obtained through image-capturing performed by the image-capturing device; a mode setting device that, in response to an external operation, sets or clears (1) an acceptability selection mode in which image data with a high evaluation from the photographic evaluation device among image data obtained through continuous image-capturing performed by the image-capturing device are selectively recorded and (2) a light emission mode in which light emission is performed automatically or unconditionally by controlling an external or internal flash unit at image-capturing by the image-capturing device, to determine a photographing sequence that corresponds to a current mode setting; and a photographic control device that implements control on the image-capturing device and the recording device in conformance to the photographing sequence determined by the mode setting device and executes photographing. And the photographic control device executes a photographing sequence selected in correspondence to a mode given higher priority in conformance to a predetermined priority order even if the acceptability selection mode and the light emission mode are set overlapping each other through an external operation.

Normally, when the acceptability selection mode and the light emission mode are set at the same time, a charge standby period for light emission is inserted after each frame during a continuous image-capturing operation performed in the acceptability selection mode. This causes a problem in that the acceptability selection mode cannot be executed smoothly and quickly. In addition, during a flash photographing operation performed at night when the exposure time (light emission time) is extremely short, in particular, a camera vibration blur or a subject-motion blur does not occur readily and thus, the need to set the acceptability selection mode is not great. For these reasons, one of (C1)~(C3) below is implemented in the structure described above as a device for ensuring that the acceptability selection made and the light emission mode are not set at the same time.

(C1) Prohibition of Acceptance of External Operation

When the acceptability selection mode and the light emission mode overlap, the mode setting device prohibits (rejects, disregards or invalidates) acceptance of a mode setting operation. Consequently, the light emission mode cannot be set after the acceptability selection mode has been set. Likewise, the acceptability selection mode cannot be set after the light emission mode has been set. As a result, the acceptability selection mode and the light emission mode are not set at the same time, thereby eliminating problems resulting from the two modes being used at the same time with a high degree of reliability. In particular, during such an operation, the acceptance of an external operation is prohibited at the point in time at which the external operation is attempted by the photographer. This prompts awareness on the part of the photographer that these modes cannot be set at the same time.

(C2) Automatic Clearing of Either Mode

The mode setting device automatically (forcibly) clears at least one of the modes when the acceptability selection mode and the light emission mode overlap. This ensures that the acceptability selection mode and the light emission mode are never set at the same time, thereby eliminating problems caused by the two modes being used together with a high degree of reliability. In particular, during such an operation, by giving priority to the mode to be set anew and automatically clearing the mode that was previously set, the most recent photographing intention of the photographer can be accurately reflected in the mode setting of the image processing apparatus. In addition, in this case, the photographer is not required to clear the previous mode that was set before any problems occur due to the setting of the new mode. As a result, the operability in mode setting further improves. Moreover, during such an operation, by fixing one specific mode as the mode to be automatically cleared regardless of the sequence of the external operation, the priority order of the modes can be determined in advance. For instance, by setting the acceptability selection mode as the mode to be automatically cleared when the acceptability selection mode and the light emission mode overlap, the light emission mode can be given priority over the acceptability selection mode for execution at all times.

(C3) Photographing Sequence Unaffected by Mode Setting

The mode setting device ensures that when the acceptability selection mode and the light emission mode overlap, the state in which these modes are used together is not reflected in the photographing sequence. Thus, even if the two modes are set at the same time, the photographing sequence in the acceptability selection mode and the photographing sequence in the light emission mode are not executed simultaneously, thereby eliminating problems resulting from the two modes being used at the same time with a high degree of reliability. This may be achieved by determining the priority order of the modes in advance and by executing the mode given higher priority first.

Under normal circumstances, the continuous shooting mode or the like is often used only temporarily in a specific photographing situation. In such a case, the photographer can manually clear the problematic mode to eliminate any problems resulting from modes being set concurrently. At this point, if the mode setting device has separately cleared the mode on a temporary basis automatically, the mode desired by the photographer may not be restored. However, according to the present invention, the "automatic mode clearance" is also reverted to the previous state in this case. Thus, it is possible to shift to the mode setting intended by the photographer with a high degree of reliability.

A recording medium according to the present invention has a control program to be utilized at an image processing apparatus having an image selecting function recorded therein. The control program comprising: an instruction for taking in a plurality of sets of image data of a subject obtained through image-capturing, an instruction for performing acceptability evaluation on each of the plurality of sets of image data; and an instruction for selecting image data ranked high in the is acceptability evaluation among the image data having undergone the acceptability evaluation.

A data signal embodied in a carrier wave according to the present invention comprises a control program for use by an image processing apparatus having an image selecting function. The control program comprising: an instruction for taking in a plurality of sets of image data of a subject obtained through image-capturing; an instruction for performing acceptability evaluation on each of the plurality of sets of image data; and an instruction for selecting image data ranked high in the acceptability evaluation among the image data having undergone the acceptability evaluation.

In recent years, an image processing apparatus (for example an electric camera) is often constituted as a system comprising an image-capturing unit, an information processing unit (which includes a computer and a palm-size electronic notepad) and the like. Thus, the image processing apparatus described above can be achieved by providing a program that achieves the functions of the evaluation device and the acceptability selection device described above on a recording medium for the information processing unit in the system configuration described above.

In addition, a system may be achieved in a computer whereby image data are taken into the computer from an electric camera, a communication medium, a recording medium, a scanner, a separate program or the like to execute acceptability selection on these image data. A program can be provided for the computer in such a system through the recording medium described above, too.

These programs may be also provided by a signal embodied in a carrier wave through a communication line such as the internet.

BRIEF DESCRIPTION OF THE DRAWINGS

FIG. 11 illustrates the image compression routine implemented for acceptability evaluation;

FIG. 12 illustrates the finder display routine;

DESCRIPTION OF THE PREFERRED EMBODIMENTS

First Embodiment

Figure 1:
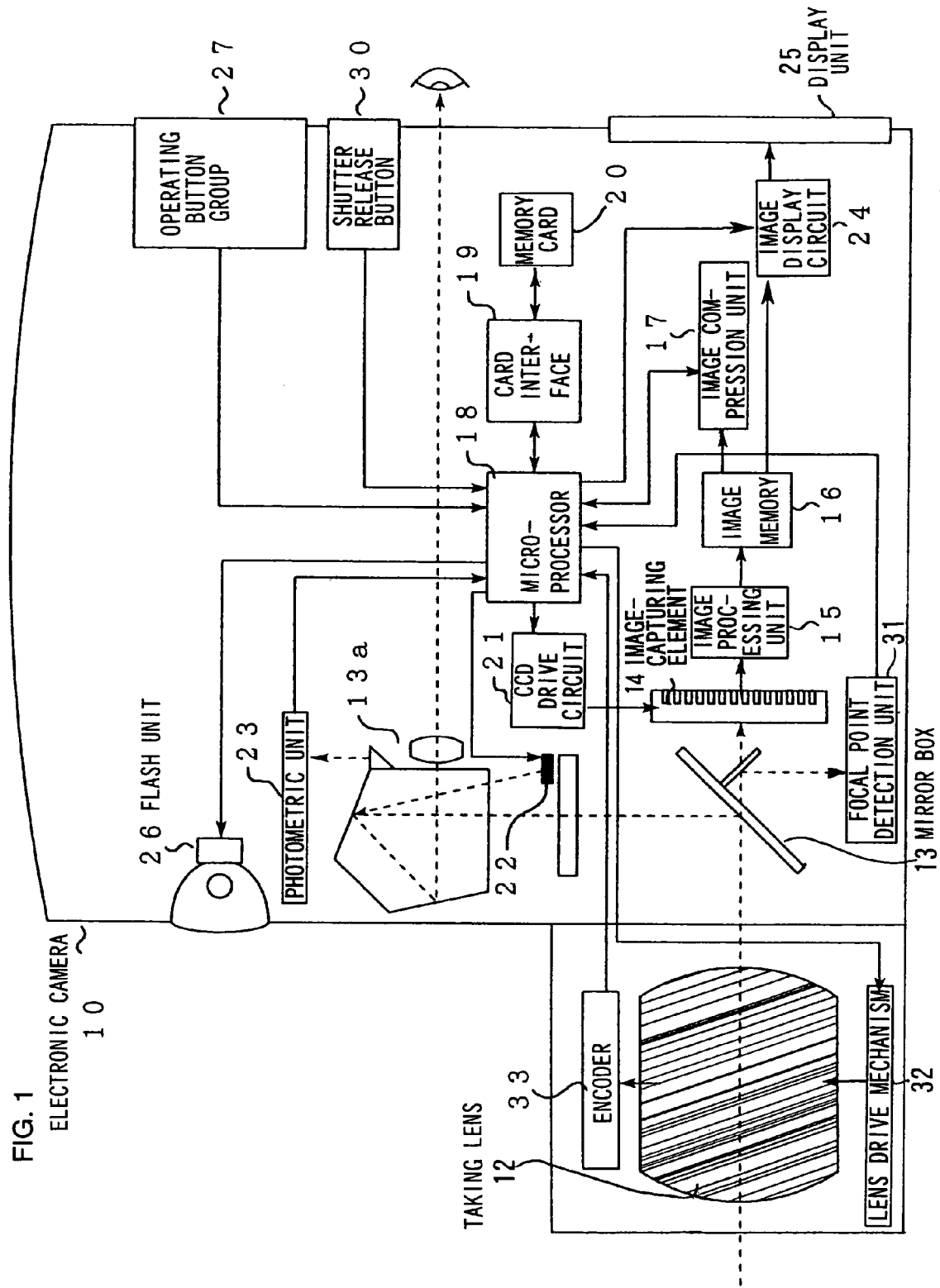
FIG. 1 is a block diagram illustrating the structure of the electronic camera in a first embodiment.

In the first embodiment, an electronic camera that performs acceptability evaluation and image selecting after completing a continuous image-capturing operation is achieved. The acceptability evaluation means evaluating whether or not the image is good. FIG. 1 is a block diagram illustrating the structure of an electronic camera 10. In FIG. 1, at the front surface of the electronic camera 10, a taking lens 12 is mounted. The light receiving surface of an image-capturing element 14 is positioned toward the image space of the taking lens 12 via a mirror box 13. A finder optical system 13a is provided along the direction of the reflection of the mirror box 13.

An image output from the image-capturing element 14 is stored in an image memory 16 via an image processing unit 15 which engages in color signal processing, A/D conversion, gamma correction and the like, in addition, an image compression unit 17 and an image display circuit 24 are connected to the data bus of the image memory 16. The image compression unit 17 is connected to a microprocessor 18, and a memory card 20 is detachably connected to the microprocessor 18 via a card interface 19.

The microprocessor 18 is further connected with a CCD drive circuit 21 provided to implement control of the image-capturing element 14, a viewfinder display unit 22 provided to implement display within the viewfinder, a photometric unit 23 that measures the brightness of a subject, the image display circuit 24, a flash unit 26 and the like. An image output from the image display circuit 24 is supplied to a monitor display unit 25 provided at the rear surface of the casing of the electronic camera 10.

In addition, operating members such as an operating button group 27 and a shutter release button 30 are provided at the casing of the electronic camera 10. Outputs from these operating members are all supplied to the microprocessor 18. A focal point detection unit 31 is provided under the mirror box 13. Focal point detection data output by the focal point detection unit 31 are provided to the microprocessor 18. The microprocessor 18 is further connected with a lens drive mechanism 32 that drives a focus lens group of the taking lens 12 back and forth and an encoder 33 that detects the position of the focus lens group at the taking lens 12.

(Overview of the Main Routine)

One of the photographing modes that may be set at the electronic camera 10 is a mode for recording image data having undergone acceptability selection (hereafter referred to as "acceptability selection mode"). Normally, image data resulting from an image-capturing operation are recorded in a recording medium such as a memory card after they undergo a specific type of image processing in units of captured images. However, in the acceptability selection mode, an image-capturing operation is performed on a subject continuously under specific conditions, the acceptability of image data resulting from the continuous image-capturing operation is judged and the best image among the image data having undergone the decision-making is selected to be recorded in the recording medium.

Figure 2:
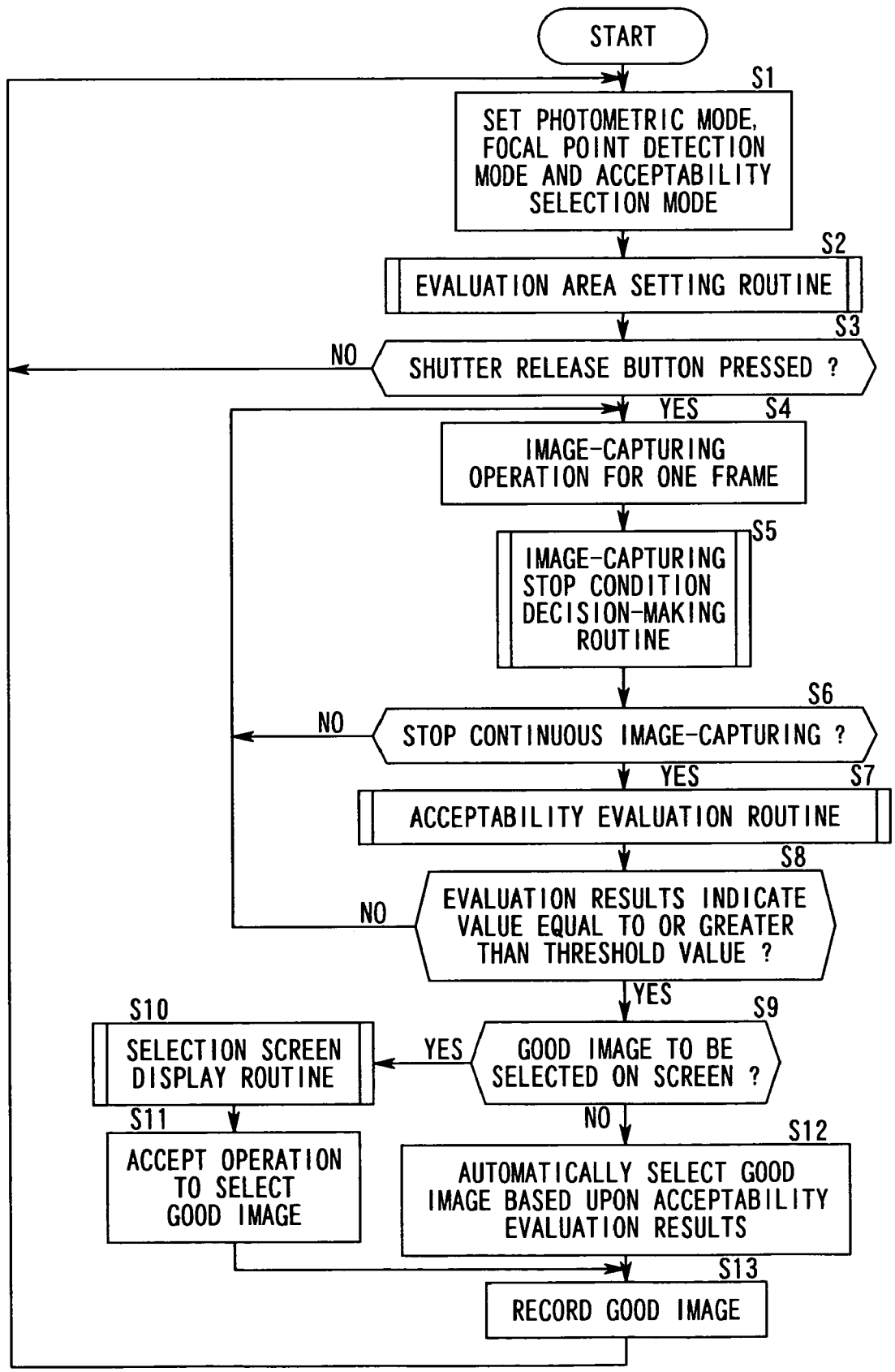
FIG. 2 illustrates the main routine implemented in the first embodiment.

In other words, in a single scene which is cohesive over time, a plurality of images are captured as captured image candidates of this scene and a good image among them is selected to be recorded at the recording medium as the image of the scene. While a subject image is captured continuously in a similar manner in the continuous shooting mode which is set when capturing the image of a moving subject, it differs from the acceptability selection mode in that the individual sets of image data resulting from the continuous image-capturing operation in the continuous shooting mode are all recorded. FIG. 2 shows the main routine executed by the microprocessor when the acceptability selection mode is set. The schematic flow of the main routine is explained below before the operation is explained in detail.

First, in response to a switching operation at the operating switch group 27, the microprocessor 18 sets various modes including a photometric mode, a focal point detection mode and the acceptability selection mode (step S1). Next, the microprocessor 18 executes the routine for setting evaluation areas (to be detailed later) to set evaluation areas (step S2). The microprocessor 18 repeats these operations until the shutter release button 30 is pressed (step S3 No). If the shutter release button 30 is pressed by the user in this state (step S3 YES), the microprocessor 18 drives the image-capturing element 14 via the CCD drive circuit 21 to execute an image-capturing operation for one frame (step S4).

Next, the microprocessor 18 executes the decision-making routine with regard to the image-capturing stop conditions (to be detailed later) to make a decision as to whether or not the continuous image-capturing operation is to be stopped (step S5). If it is decided that the stop flag has been reset (cleared) through this decision-making routine (step S6 No), the microprocessor 18 returns to the operation in step S4 to repeat the continuous image-capturing.

If, on the other hand, the stop flag has been set (step S6 YES), the microprocessor 18 executes the acceptability evaluation routine (to be detailed later) in which acceptability evaluation is performed for all the image data resulting from the continuous image-capturing operation (step S7). A specific length of time determined by the exposure time and the image processing time is set for the time intervals elapsing between individually captured images during continuous image-capturing. For example, two through thirty frames may be captured per second.

Next, the microprocessor 18 makes a decision as to whether or not at least one set of the acceptability evaluation results exceeds a preset threshold value (step S8). If none of the acceptability evaluations are equal to or greater than the threshold value (step S8 NO), the microprocessor is returns to the operation in step S4 to perform continuous image-capturing again.

If there is an acceptability evaluation exceeding the threshold value, on the other hand (step S8 YES), the microprocessor 18 decides that good image data have been captured to shift to the next image selecting operation.

During the image selecting operation, the microprocessor 18 makes a decision as to whether or not a good image selection is to be performed on the screen by judging the operating conditions in the acceptability selection mode (step S9). At this time, if the user has already selected operating conditions for selecting the image on the screen (step S9 YES), the microprocessor 18 executes the selection screen display routine (to be detailed later). As a result, the "thumbnail display of image data obtained through continuous image-capturing" and the "ranking of acceptability evaluation" are displayed together overlapping at the display unit 25 (step S10).

The user manually selects one set of image data on the display unit 25 as a good image by operating the operating button group 27 or the like (step S11). After accepting the manual selection of the good image, the microprocessor 18 shifts to the operation in Step S13. If, on the other hand, operating conditions for automatically selecting an image are selected in step S9 (step S9 NO), the microprocessor 18 selects the image data that are first in the ranking of acceptability evaluation as a good image (step S12).

The microprocessor 18 compresses the good image selected in step S11 or step S12 in this manner and records the compressed image data at the memory card 20 via the card interface 19. Through the series of operations described above, the photographing operation in the acceptability selection mode is completed.

Next, the details of the various sub-routines mentioned above are individually explained.

(Evaluation Area Setting Routine)

In FIGS. 3A through 3D and 4, several examples of the evaluation area setting routine are presented. The following is an explanation of these examples, given in the order that they are presented.

Figure 3A:
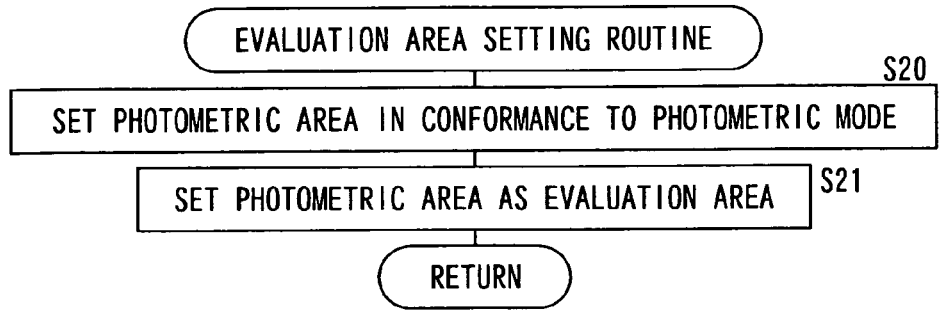
FIGS. 3A through 3D present routines for setting evaluation areas.

(Setting Routine in FIG. 3A)

First, the microprocessor 18 sets a photometric area as described below in correspondence to the type of photometric mode set by the photographer (step S20).

Figure 5A:
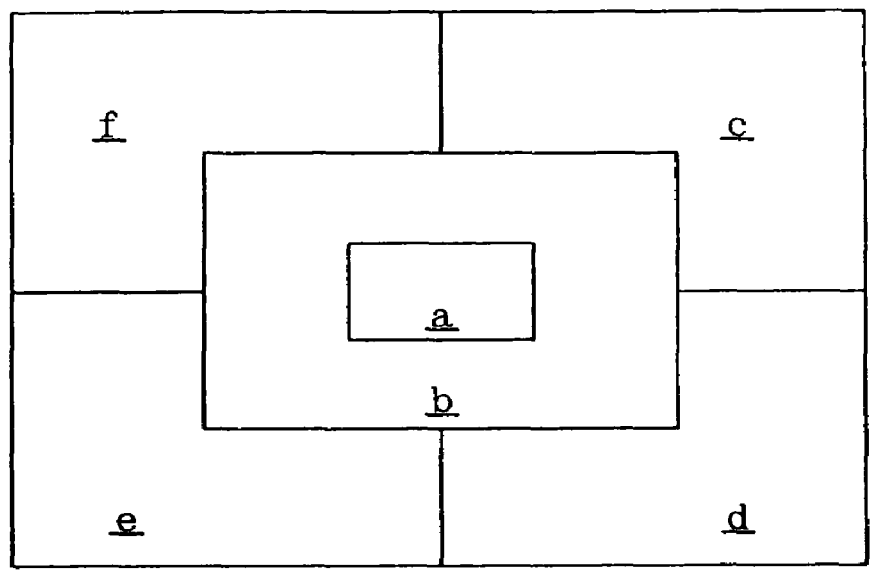
FIGS. 5A through 5C illustrate examples of positions of the various types of areas.

1) Spot photometric mode: An area (a) in FIG. 5A is set as the photometric area.
2) Centrally weighted photometric mode: Areas (a) and (b) in FIG. 5A are set as photometric areas (the area (a) is weighted greater than the area (b)).
3) Multi-photometric mode: Among areas (a)–(f) in FIG. 5A, a light area (EV11 or higher) and a dark area (EV3 or lower) where the gradation reproducibility is reduced are excluded, and the remaining areas are set as photometric areas.

Next, the microprocessor 18 uses the photometric areas thus set and their evaluation weighting unchanged to determine the evaluation areas (step 21).

Figure 3B:
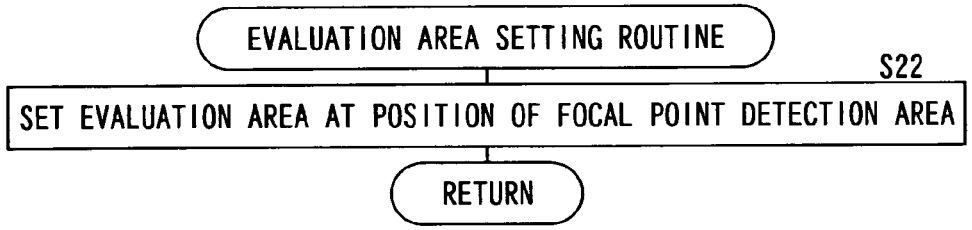

(Setting Routine in FIG. 3B)

Figure 5B:
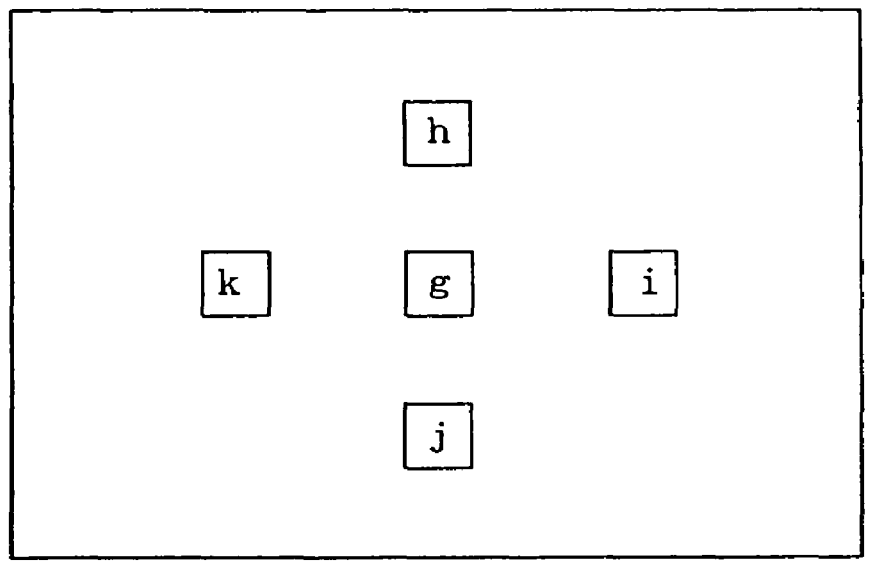

Within the photographic image plane of the electronic camera 10, five areas (g)~(k) where focal point detection is possible are set in advance as shown in FIG. 5B. The photographer can select a desired focal point detection area is from the areas (g)~(k) by operating the operating button group 27. Alternatively, the microprocessor 18 may identify the area where the closest subject is located based upon the focal point detection data corresponding to the individual areas to automatically select the area as a focal point detection area. Furthermore, the focal point detection area may be changed in conformance to the movement of a moving subject by adopting the focal point detection technology of the known art. The microprocessor 18 sets an evaluation area at the current position of the focal point detection area selected in this manner (step S22).

Figure 3C:
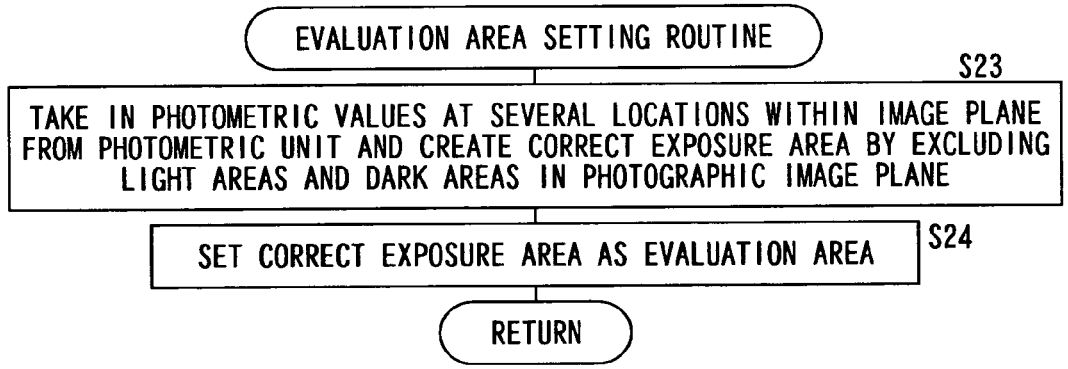

(Setting Routine in FIG. 3C)

First, the microprocessor 18 takes in the photometric values obtained at several points within the image plane from the photometric unit 23. Based upon these photometric values, the microprocessor 18 excludes the light areas and the dark areas from the photographic image plane and creates a correct exposure area (step S23). The microprocessor 18 then sets the correct exposure area thus created as an evaluation area (step S24).

Figure 3D:
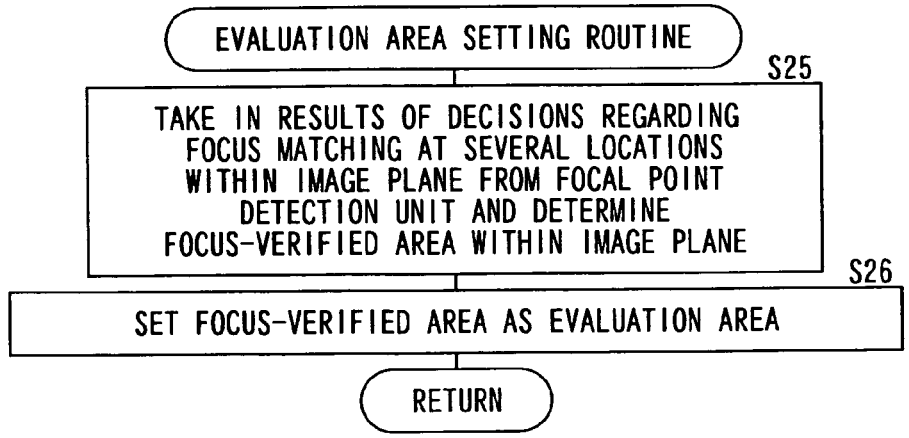

(Setting Routine in FIG. 3D)

The microprocessor 18 first performs decision-making with regard to focus matching at several points within the image plane via the focal point detection unit 31 and prepares a focus-verified area (step S25). The microprocessor 18 then sets the focus-verified area thus prepared as an evaluation area (step S26). It is to be noted that such setting of an evaluation area does not need to be performed only during the execution of automatic focal point control, but may be performed during manual focal adjustment or during focus aid.

Figure 4:
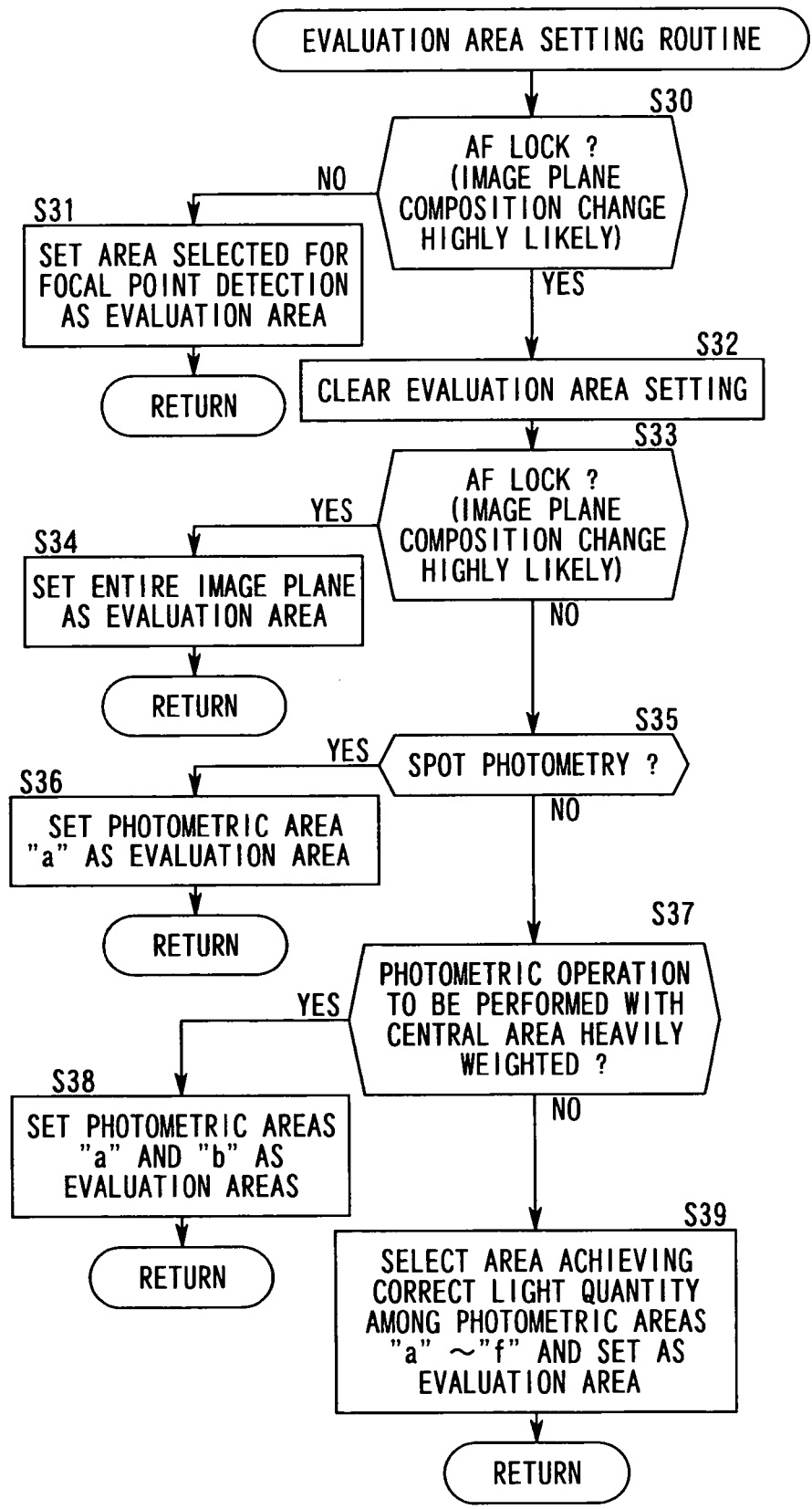
FIG. 4 illustrates a routine for setting evaluation areas.

(Setting Routine in FIG. 4)

First, the microprocessor 18 ascertains the switching state at the operating button group 27 and makes a decision as to whether or not an operation for locking the focal adjustment (so-called AF lock) has been performed by the photographer (step S30). If AF lock has not been implemented, the microprocessor 16 sets the area selected for focal point detection as an evaluation area (step S31).

If, on the other hand, AP lock has been implemented, it is likely that the photographer wishes to change the framing in order to change the image composition. For this reason, the microprocessor 18 clears the current evaluation area setting (step S32). Next, the microprocessor 18 ascertains the switching state at the operating button group 27 to make a decision as to whether or not an operation for locking the exposure adjustment (so-called AS lock) has been performed by the photographer (step S33).

At this point, if AE lock has been implemented, it is likely that the photographer wishes to change the framing in order to change the image composition. For this reason, the microprocessor 18 does not set an evaluation area range at this point and instead, resets the entire image plane as the evaluation area (step S34). If, on the other hand, AE lock has not been implemented, the microprocessor 18 sets the area selected for photometry as the evaluation area (steps S35–S39).

(Image-capturing Stop Condition Decision-making Routine)

Figure 6:
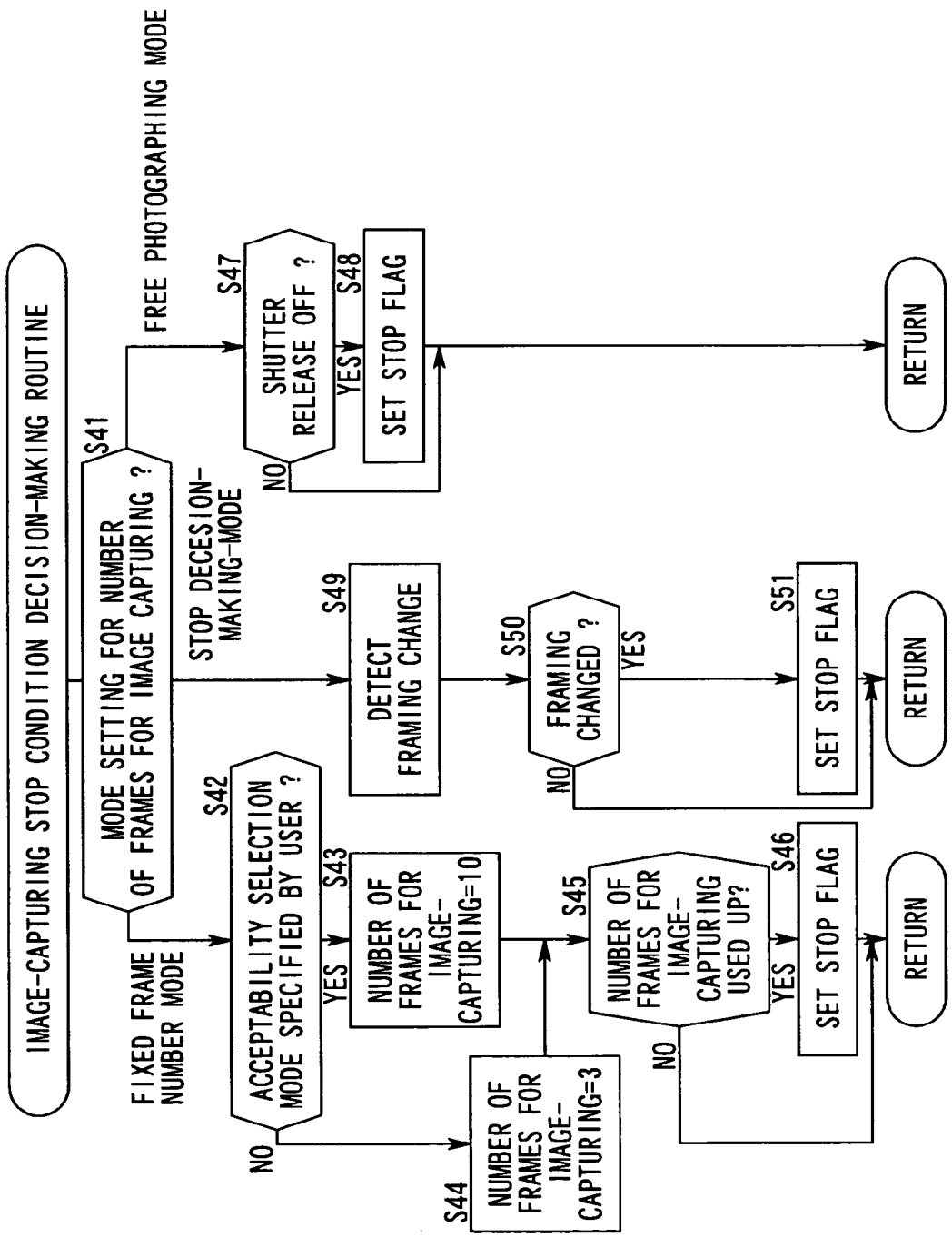
FIG. 6 illustrates the decision-making routine implemented with regard to the image-capturing stop conditions.

Next, the image-capturing stop condition decision-making routine is explained. FIG. 6 illustrates the image-capturing stop condition decision-making routine When this decision-making routine is started up from the main routine, the microprocessor 18 first identifies the mode setting for the number of frames for image-capturing (step S41). At this point, if the fixed frame number mode has been selected by the photographer, the microprocessor 18 makes a decision as to whether or not the photographer has intentionally selected the acceptability selection mode (step S42). When the acceptability selection mode has been selected on purpose, the photographer will not sense anything amiss even if the number of frames for image-capturing is large. For this reason, the microprocessor 18 sets the number of frames for image-capturing at a relatively large value (10 frames in this example) (step S43).

In the event that the acceptability selection mode has been automatically selected (e.g., the microprocessor 18 may automatically select the acceptability selection mode in a state in which camera vibration tends to occur readily as in a macro-photographing mode), on the other hand, the photographer will tend to feel strange if the number of frames for image-capturing is large. Thus, in such a case, the microprocessor 18 sets the number of frames for image-capturing at a relatively small value (3 frames in this example) (step S44). It is to be noted that a fixed number of frames may be set in advance during the setting operation (step S1) prior to a shutter release.

Next, the microprocessor 18 makes a decision as to whether or not the image-capturing operation has been performed for the entire number of frames set for image-capturing (step S45). At this point, if the operation has not been completed for the entire number of frames set for image-capturing, the microprocessor 18 returns to the operation in the main routine while holding the stop flag in a reset state. If, on the other hand, the operation has achieved to capture images for the entire number of frames that has been set, the microprocessor 18 decides that the image-capturing stop conditions have been met and sets the stop flag (step S46) before returning to the operation in the main routine.

In addition, if it is decided in step S41 that a free photographing mode has been set, the microprocessor 18 makes a decision as to whether or not pressure on the shutter release button 30 has been released (step S47). At this point, if the shutter release button 30 is still being held down, the microprocessor 18 returns to the operation in the main routine while holding the stop flag in a reset state.

If, on the other hand, the pressure on the shutter release button 30 has been released, the microprocessor 18 decides that the image-capturing stop conditions have been satisfied and sets the stop flag (step S48) before returning to the operation in the main routine.

If it is decided in step S41 that a stop decision-making mode has been set, the microprocessor 18 detects any change in the framing based upon the differences in the image data among various frames or the like (step S49). If no change in the framing is detected, the microprocessor 18 directly returns to the operation in the main routine. If, on the other hand, a change in the framing is detected, the microprocessor 18 decides that the image-capturing stop conditions have been satisfied and sets the stop flag (step S48) before returning to the operation in the main routine.

Through the series of operations described above, the image-capturing stop condition decision-making routine is executed.

(Acceptability Evaluation Routine)

Figure 7:
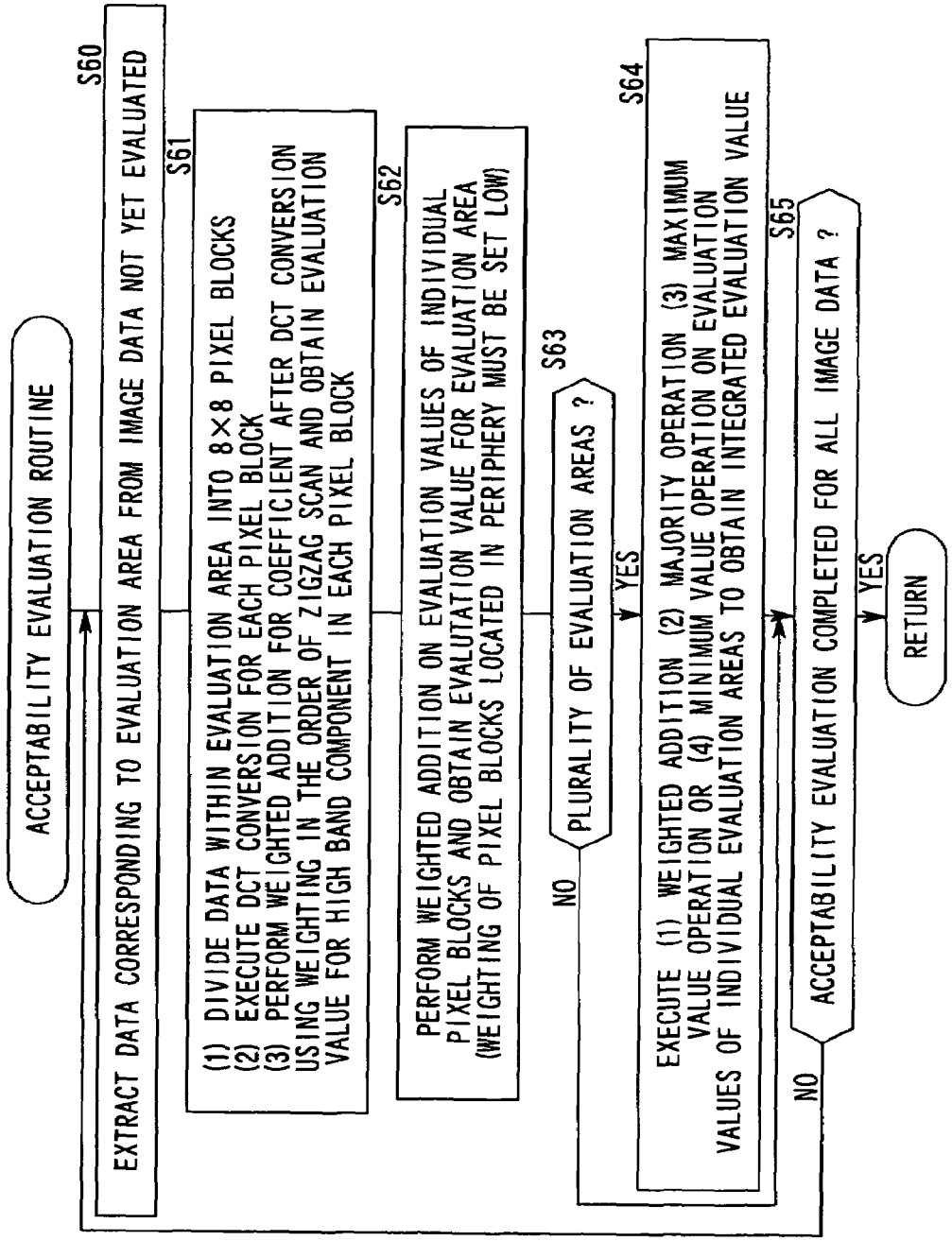
FIG. 7 illustrates the acceptability evaluation routine.

Next, the acceptability evaluation routine is explained. FIG. 7 shows the acceptability evaluation routine executed by the microprocessor 18. Initially, when the acceptability evaluation routine is started up from the main routine, the microprocessor 18 selects one set of image data that has not been evaluated yet and extracts the data included in the image data that correspond to an evaluation area (step 860). The microprocessor 18 processes the data within the evaluation area thus extracted through the following procedure by employing the image compression unit 17 (step S61).

(1) The image compression unit 17 divides the data in the evaluation area into 8×8 pixel blocks.
(2) The image compression unit 17 executes DCT conversion (discrete cosine transformation) for each pixel block.
(3) The image compression unit 17 performs weighted addition using the DCT conversion coefficient for each pixel block. During this process, by weighting the DCT conversion coefficient in the order of the zigzag scan (with greater weighting given in proportion to the level of the spatial frequency), evaluation values that indicating the content of the spatial frequency high frequency component are obtained.

Figure 5C:
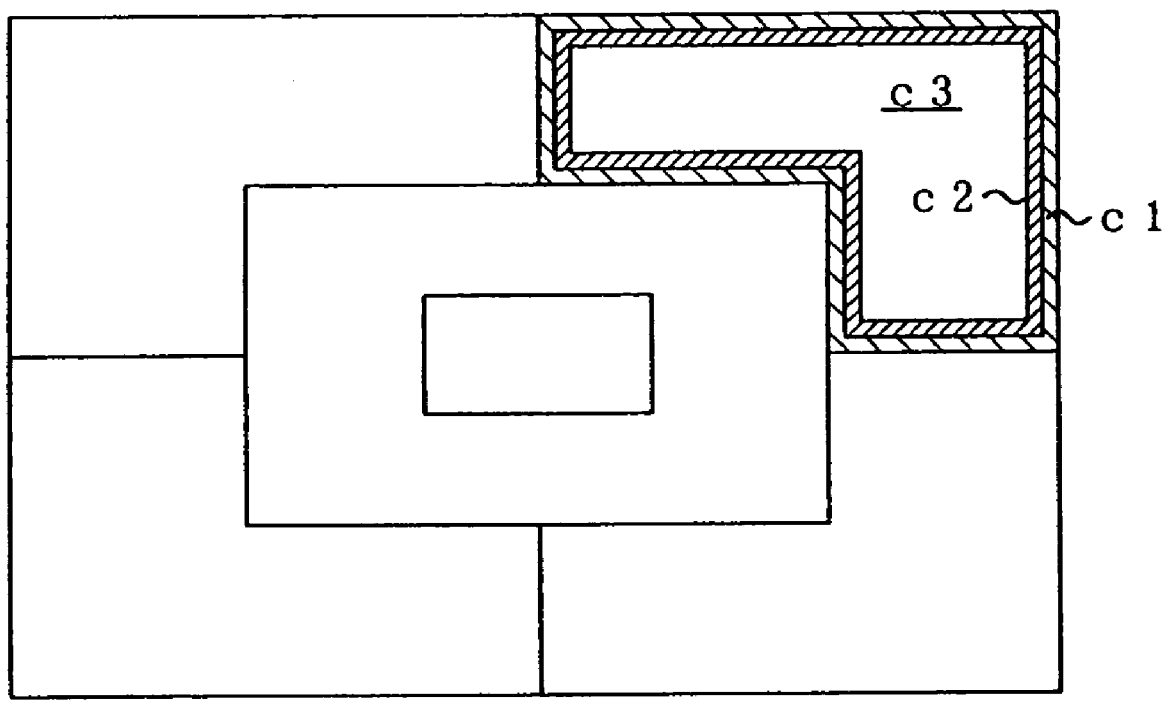

Then, by performing further weighted addition for the evaluation values representing the individual pixel blocks thus obtained, an evaluation value for the entire evaluation area is calculated (step S62). It is to be noted that the is evaluation area is divided into three areas, i.e., a peripheral portion C1, a middle portion C2 and a central portion C3, as shown in FIG. 5C at this time, with the evaluation weighting set greater for pixel blocks closer to the center of the area, as indicated in the equations below.

(Evaluation weighting for $C1$)=0.3

(Evaluation weighting for $C2$)=0.6

(Evaluation weighting for $C3$)=1.0

Then, the microprocessor 18 makes a decision as to whether or not there are a plurality of evaluation areas (step S63). If there is only a single evaluation area, the microprocessor 18 decides that the calculation of the evaluation value has been completed, ends the acceptability evaluation routine and returns to the operation in the main routine.

If, on the other hand, there are a plurality of evaluation areas, the microprocessor 18 executes (1) weighted addition, (2) majority operation, (3) maximum value operation, (4) minimum value operation or the like on the evaluation values corresponding to the individual evaluation areas to determine an integrated evaluation value (stop S64), this sequence of processing is implemented for all the image data having undergone image-capturing (step S65).

(Selection Screen Display Routine)

Figure 8:
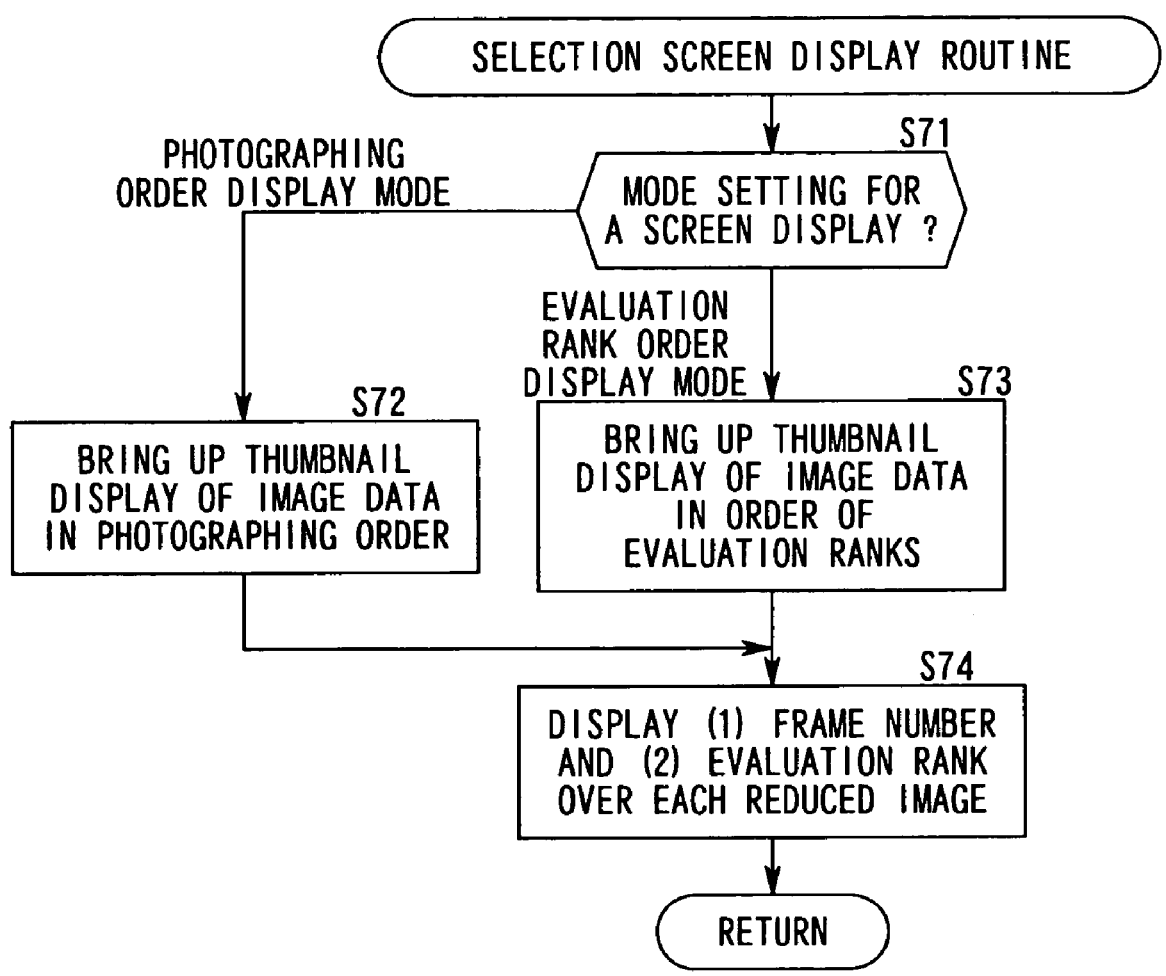
FIG. 8 illustrates the routine for displaying the selection screen.

The following is an explanation of the selection screen display routine. FIG. 8 is a flowchart of the selection screen display routine executed by the microprocessor 18. First, when the image-selection display routine is started up from the main routine, the microprocessor 18 makes a decision with regard to the mode setting for screen display (Step S71).

At this point, if the photographing order display mode has been selected by the photographer, the microprocessor 18 brings up a thumbnail display of image data in the order in which they were photographed on the display unit 25 via the image display circuit 24 (step S72). If, on the other hand, the evaluation rank order display mode has been selected by the photographer, the microprocessor 18 brings up a thumbnail display of image data in the order of evaluation ranks on the display unit 25 via the image display circuit 24 (step S73)

Figure 9A:
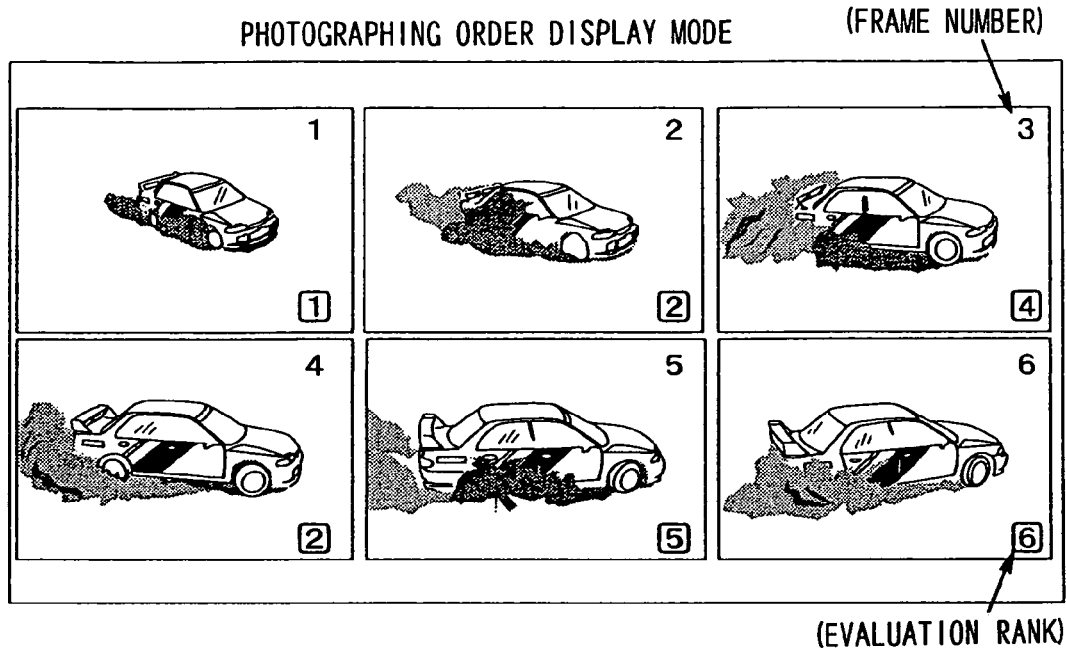
FIGS. 9A–9B presents examples of the selection screen display.
Figure 9B:
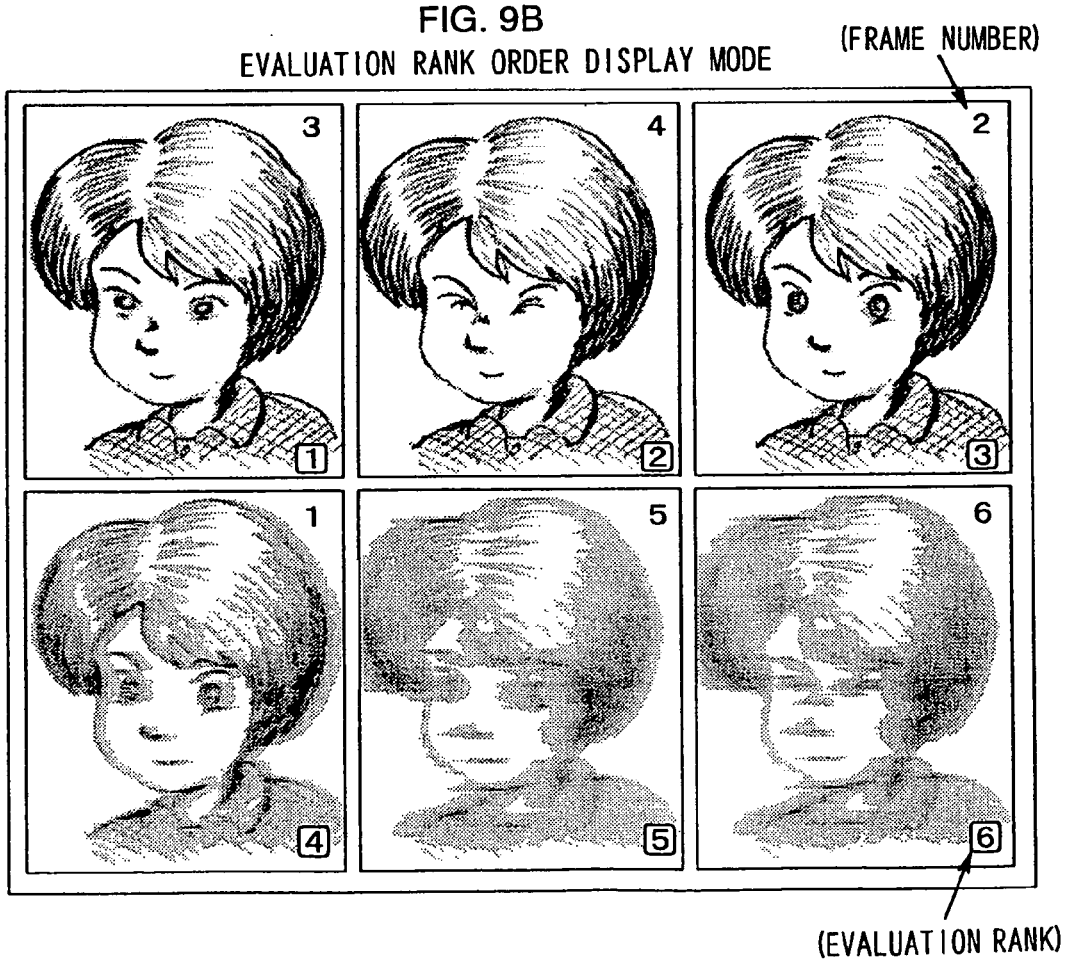

The microprocessor 18 brings up a display of frame numbers and the evaluation ranks overlapping the reduced images brought up on thumbnail display via the image display circuit 24 (step S74). FIG. 9A illustrates a selection screen displayed in the photographing order display mode. In this selection screen, the image data in the first frame, which are ranked the highest in the evaluation, include the subject photographed rather small due to inappropriate timing of the photographing operation. In this situation, the photographer may take into consideration both the shutter timing and the evaluation ranking to select a good image, e.g., the image data in the fourth frame.

In addition, FIG. 9D presents a selection screen that may be displayed in the evaluation rank order display mode. In this selection screen, the image data ranked the highest in the evaluation have been obtained through inopportune shutter timing with the subject's eyes partially closed. In this situation, the photographer may take into consideration both the shutter timing and the evaluation ranks to make a selection of a good image, e.g., the image data ranked third in the evaluation.

In the first embodiment, through the operation explained above, there are advantages as follows.

(1) Image data with a high content of the high spatial frequency component can be selected and recorded from image data obtained through continuous image-capturing. Consequently, image data that contain reduced degrees of camera vibration blur, subject-motion blur and poor focus as a whole can be selectively obtained.

(2) Since acceptability evaluation is performed on image data within an evaluation area that only partially occupies the entire image plane, an accurate acceptability evaluation of the image data can be achieved while the degree to which blurring in the background image and the like affects the overall evaluation can be minimized. Furthermore, since the acceptability evaluation is not performed on the entire image plane, the length of time required for the acceptability evaluation processing can be reduced.

(3) Since the evaluation weighting is set lower toward the periphery of the evaluation area compared to the evaluation weighting set for the central portion of the evaluation area, the acceptability evaluation value is not caused to fluctuate greatly by an image that accidentally jumps into the evaluation area.

(4) Since a plurality of evaluation areas can be evaluated in an integrated manner, a correct acceptability evaluation can be executed even when there are a plurality of subjects present within the image plane.

(5) An evaluation area can be set by excluding the light areas and the dark areas within the image plane. As a result, it is possible to avoid making an inappropriately low evaluation due to a brightness collapse or the like to execute a correct acceptability evaluation by focusing the attention on the subject.

(6) Since a focus-verified area can be set as an evaluation area, a correct acceptability evaluation can be executed for the image of a subject present within the image plane at a position corresponding to the focus-verified area.

(7) A photometric area or a focal point detection area may be set as an evaluation area. Consequently, a setting device for the photometric area or the focal point detection area may be utilized for setting the evaluation area, thereby making it possible to further simplify that portion of the structure of the electronic camera 10 engaged in setting these areas.

(8) Since the evaluation area setting can be automatically cleared if the photographer fixes the focal adjustment or the exposure adjustment, any reduction in the reliability of the acceptability evaluation which may be caused by a change in the image plane composition can be prevented.

(9) The number of frames for continuous image-capturing can be varied in a flexible manner during the image-capturing stop condition decision-making routine.

(10) Since a continuous image-capturing operation can be stopped immediately by detecting a change in the framing, problems of wastefully sustaining a continuous image-capturing operation after a change occurs in the framing and the like can be prevented.

(11) If none of the evaluations on the image data achieve a value equal to or higher than the threshold value, the continuous image-capturing operation is resumed. As a result, there is no risk of an acceptability selection being executed on image data with evaluation values lower than the threshold value so that storage of image data that achieve a value at least equal to or higher than the threshold value is assured.

(12) The photographer can correctly select and store image data obtained in a good photographing state via a selection screen. During the process of selection, the photographer can select image data by referring to the results of the acceptability evaluation and also taking into consideration subjective criteria such as shutter timing.

Second Embodiment

While acceptability evaluation is performed in a batch after taking in a plurality of sets of image data in the first embodiment, the electronic camera in the second embodiment performs image-capturing and acceptability evaluation on a single set of image data at a time. It is to be noted that since the structural features of the second embodiment are identical to those in the first embodiment (see FIG. 1) except for the operating program executed by the microprocessor 18, explanation of the structural features is omitted.

(Overview of the Main Routine)

Figure 10:
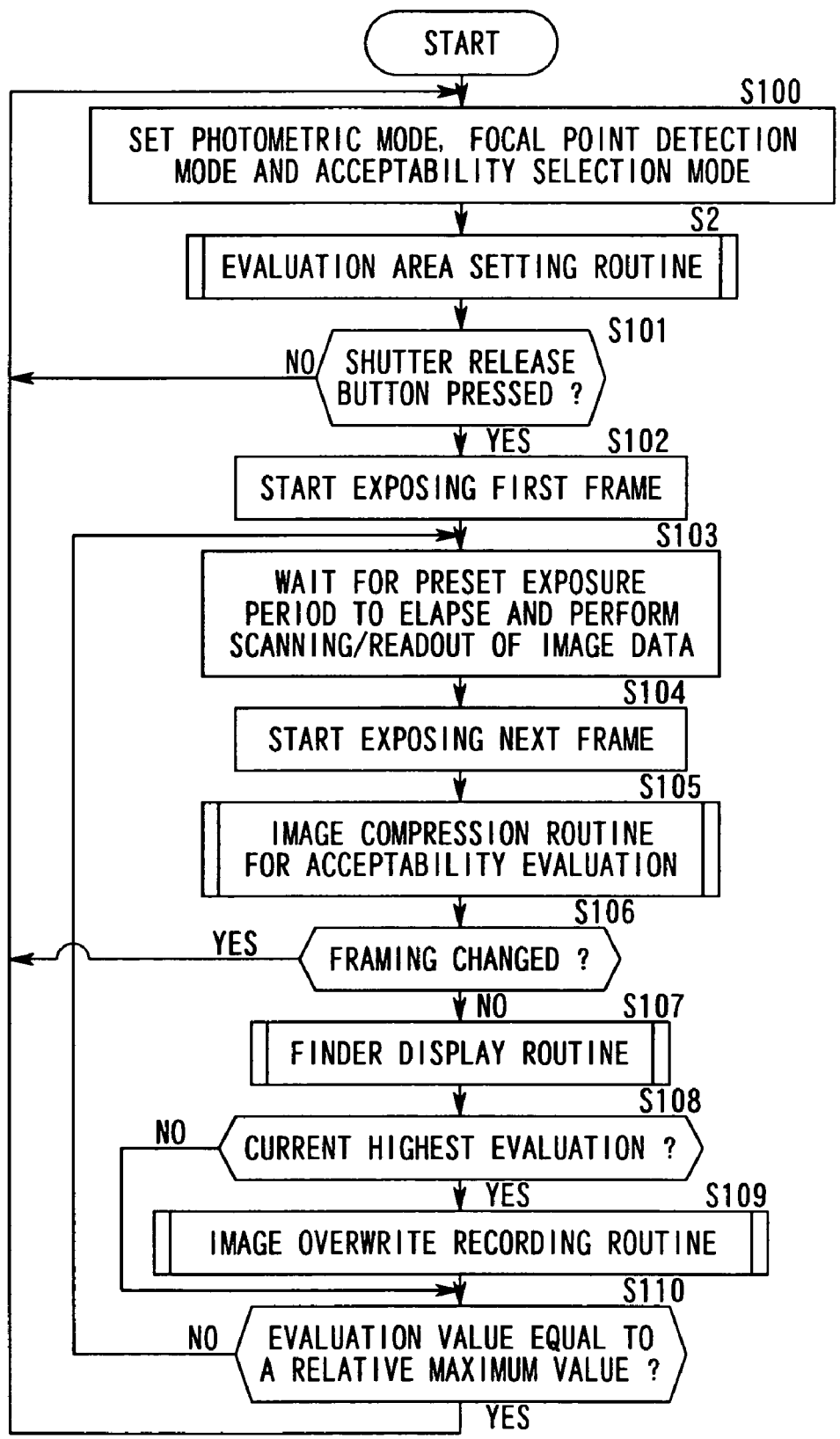
FIG. 10 illustrates the main routine implemented in a second embodiment.

FIG. 10 shows the main routine executed by the microprocessor 18 when the acceptability selection mode is set. The schematic flow of the main routine is explained below before the operation is explained in detail.

First, in response to a switching operation at the operating switch group 27, the microprocessor 18 sets various modes including the photometric mode, the focal point detection mode and the acceptability selection mode (step S100). Next, the microprocessor 18 executes the evaluation area routine (step S2) as in the first embodiment. The microprocessor 18 repeats these operations until the shutter release button 30 is pressed (step S101 NO).

If the shutter release button 30 is pressed by the user in this state (step S101 YES), the microprocessor 18 sweeps out unnecessary electrical charges at the image-capturing element 14 via the CCD drive circuit 21 and starts an exposure operation for the first frame (step S102). The microprocessor 18 waits for the preset exposure period (shutter time) to elapse, and then implements control on the CCD drive circuit 21 to read out image data from the image-capturing element 14 (step S103). At the point in time at which the image data readout starts, an exposure operation of the next frame starts at the image-capturing element 14 (step S104).

The microprocessor 18 executes the image compression routine (to be detailed later) for acceptability evaluation and performs acceptability evaluation on the image data for which the image-capturing operation has just been completed (step S105). At this point, if the change in the acceptability evaluation results relative to the previous results indicates a value equal to or greater than a threshold value, the microprocessor 18 decides that a change in the framing has occurred (step S106 YES). Since the picture composition itself in the image data changes in such a situation, the microprocessor 18 decides that acceptability evaluation can no longer be performed under the same conditions and stops the continuous image-capturing operation before returning to the operation in step S100.

If, on the other hand, the change in the acceptability evaluation results relative to the previous results indicates a value smaller than the threshold value, the microprocessor decides that no change in the framing has occurred (step S106 NO). In this situation, the microprocessor 18 continues continuous image-capturing by shifting its operation to step S107. It is to be noted that it is desirable to set an area where the image composition changes greatly (e.g., the periphery of the photographic image plane) as a framing change detection area The difference in the image data among individual frames, fluctuations in the acceptability evaluation results or the like within the detection area can be monitored by the microprocessor 18 to promptly detect a framing change.

Next, the microprocessor 18 executes the finder display routine (to be detailed later) to display the results of the acceptability evaluation at the finder display unit 22 (step S107). At this point, the microprocessor 18 makes a decision as to whether or not the results of the acceptability evaluation performed on the latest set of image data indicate the highest evaluation value thus far (step S108). If the latest set of image data achieves the highest rank in the evaluation (step S108 YES), the microprocessor 18 executes the image overwrite recording routine (to be detailed later) to overwrite the recorded image on the memory card 20 with the latest set of image data (step 109). If, on the other hand, the latest set of image data does not achieve the highest rank in the evaluation (step S108 NO), the microprocessor 18 does not execute any image overwrite recording and, as a result, the recorded image on the memory card 20 is not updated.

Next, the microprocessor 18 makes a decision as to whether or not the results of the acceptability evaluation have exceeded a relative maximum point (step S110). If it is decided that the acceptability evaluation results have not exceeded the relative maximum point (step S110 NO), it can be decided that the acceptability evaluation on the image data is likely to improve further. Thus, the microprocessor 18 returns to the operation in step S103 and continuous with the continuous image-capturing operation.

If, on the other hand, the results of the acceptability evaluation have clearly exceeded the relative maximum point (step S109 YES), it can be decided that the image data acceptability evaluation is not likely to improve any further. Thus, the microprocessor 18 returns to the operation in step S100 to complete the image-capturing operation in the acceptability selection mode for the time being.

Through the series of operations described above, the image-capturing operation in the acceptability selection mode is completed.

Next, details of the various sub-routines mentioned above are individually explained.

(Image Compression Routine for Acceptability Evaluation)

FIG. 11 presents the image compression routine implemented for acceptability evaluation. First, when this image compression routine is started up from the main routine, the microprocessor 18 issues a command to the image compression unit 17 to perform image compression for acceptability evaluation. In response to this command, the image compression unit 17 extracts the image data corresponding to the evaluation areas included in the latest set of image data. The image compression unit 17 compresses the extracted image data using a compression parameter for acceptability evaluation (a scale factor or a quantization table with a compression ratio of approximately $\frac{1}{10}$ in this example) (step S111).

Next, the microprocessor 18 ascertains the post-compression code volume of the image data having undergone the image compression and assigns the code volume as the evaluation value for the latest set of image data (step S112). After obtaining the evaluation value as described above, the microprocessor 18 returns to the operation in the main routine.

(Finder Display Routine)

FIG. 12 shows the finder display routine. When the finder display routine is started up from the main routine, the microprocessor 18 makes a decision as to whether or not the evaluation value of the current set of image data is the highest evaluation value (step S115).

Figure 13:
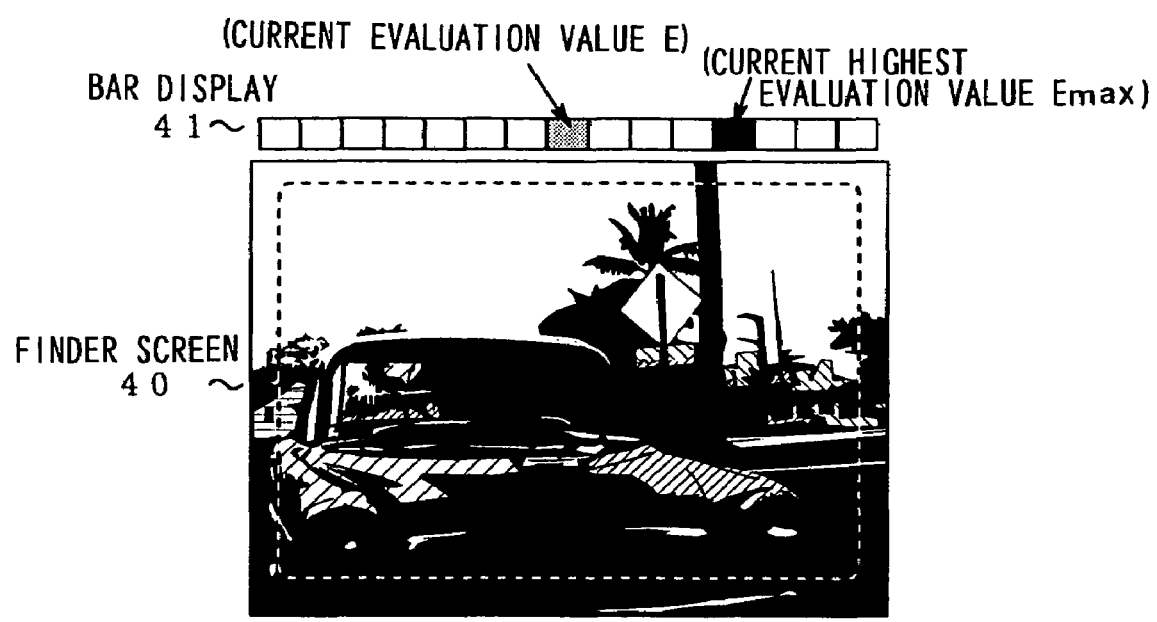
FIG. 13 presents an example of finder display.

If the evaluation value is ranked the highest in the evaluation (step S115 YES), the microprocessor 18 uses the current evaluation value E to update the highest evaluation value Emax stored in advance in the internal memory area (step S116). If, on the other hand, the current evaluation value is not ranked the highest (step S115 NO), the microprocessor 18 sustains the highest evaluation value Emax unchanged. Next, the microprocessor 18 brings up a bar display of the highest evaluation value Emax and the current evaluation value E at the finder display unit 22 (step S117). Through the finder display routine described above, a display is brought up in the finder as illustrated in FIG. 13.

(Image Overwrite Recording Routine)

Figure 14:
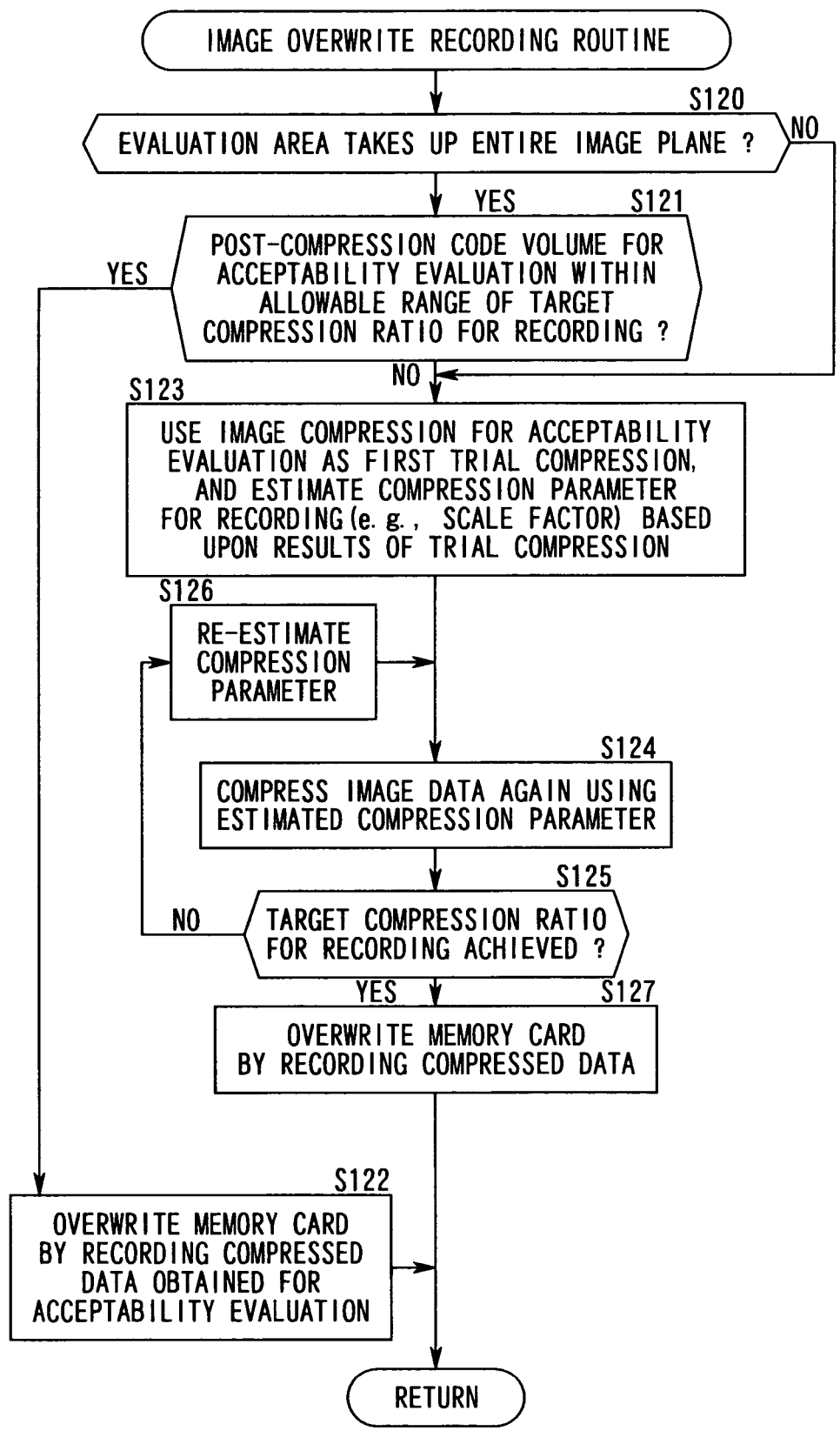
FIG. 14 illustrates the routine implemented for image overwrite recording.

FIG. 14 illustrates the image overwrite recording routine. First, when the image overwrite recording routine is started up from the main routine, the microprocessor 18 makes a decision as to whether or not the entire image plane is set as the evaluation area (step S120). If it is decided that only a portion of the image plane has been set as the evaluation area (step S120 NO), the microprocessor 18 shifts its operation to step S123 to perform image compression anew for the entire image plane.

If, on the other hand, the entire image plane is set as an evaluation area (step S120 YES), the microprocessor 18 makes a decision as to whether or not the post-compression code volume for the acceptability evaluation is within the allowable range for the target post-compression code volume for recording (step S121). If it is decided in step S121 that the post-compression code volume for the acceptability evaluation is within the allowable range for the target post-compression code volume for recording, it can be decided that it is not necessary to perform image compression again. As a result, the microprocessor 18 overwrites the memory card 20 by directly recording the data that have been compressed for the acceptability evaluation (step S122). When this overwrite recording is completed, the microprocessor 18 ends the overwrite recording routine and returns to the operation in the main routine.

If, on the other hand, it is decided in step S121 that the post-compression code volume for the acceptability evaluation is not within the allowable range for the target post-compression code volume for recording, the microprocessor 18 decides that image compression must be performed again and shifts its operation to step S123. In step S123, the results of the image compression for the acceptability evaluation are regarded as the results of a first trial compression, and the compression parameter for recording (a scale factor or a quantization table in this example) is estimated through a compression parameter estimation method in the prior art (e.g., Japanese Laid Open Patent Publication No. H4-220879, U.S. Pat. No. 5,594,554) or the method disclosed in the specification of Japanese Patent Application No. H10-284531 which is not yet known at the time of filing of this application.

Next, the microprocessor 18 performs image compression again on the current set of image data by using the estimated compression parameter (step S124). The microprocessor 18 then makes a decision as to whether or not the post-compression code volume thus obtained is within the allowable range for the target post-compression code volume for recording (step S125) At this point, if it is decided that the post-compression code volume is not within the allowable range for the target compression ratio for recording (step S125 NO), the microprocessor 18 re-estimates the compression parameter (step S126) before returning to the operation in step S124.

If, on the other hand, the post-compression code volume is decided to be within the allowable range for the target compression ratio for recording (step S125 YES), the microprocessor 18 overwrites the memory card 20 by recording the data that have been compressed through this process (step S127). After completing overwrite recording through this series of operations, the microprocessor 18 returns to the operation in the main routine.

Through the operations described above, there are advantages in the second embodiment as follows.

(1) It is possible to select and record image data with a high content of the high spatial frequency component among image data obtained through continuous image-capturing. Thus, image data with lesser degrees of camera vibration blur, subject-motion blur, poor focus and the like can be obtained with a high degree of reliability.

(2) In particular, since acceptability evaluation is executed concurrently during continuous image-capturing, a decision can be made as to whether or not a continuous image-capturing operation is to be stopped in correspondence to the results of the acceptability evaluation. Thus, automatic adjustment of the number of frames can be achieved with a high degree of accuracy, to efficiently avoid problems of the number of frames set too low to result in only images ranked low in evaluation being captured, the number of frames set too high to allow the photographing period to be prolonged meaninglessly and the like.

(3) Since the image compression unit 17 is utilized to execute both the image compression for acceptability evaluation and the image compression for recording, it is not necessary to provide a separate processing mechanism for acceptability evaluation, thereby achieving simplification in the structure of the electronic camera 10.

(4) A special compression parameter that is independent of the compression parameter for recording is used when executing the image compression for acceptability evaluation. As a result, the image compression can be performed at a compression ratio in the medium range, which is suitable for acceptability evaluation to achieve an accurate acceptability evaluation, regardless of the compression ratio set for recording.

(5) If the code volume of the compressed data for acceptability evaluation is determined to be suitable for recording, the compressed data are stored without further processing. Thus, it becomes possible to omit the re-compression processing for recording to effectively reduce the length of processing time.

(6) Since the results of compression performed for acceptability evaluation are regarded as a trial compression, the number of trial compressions that need to be performed during recording can be reduced with a high degree of efficiency.

(7) Since the results of the acceptability evaluation are displayed within the finder, the photographer can refer to the finder display to achieve a better photographing state for subsequent photographing operations.

(8) Since the current highest evaluation value and the latest evaluation value are displayed on the monitor, the photographer is able to achieve a better photographing state for subsequent photographing operations by using the highest evaluation value as a target.

Third Embodiment

Figure 15:
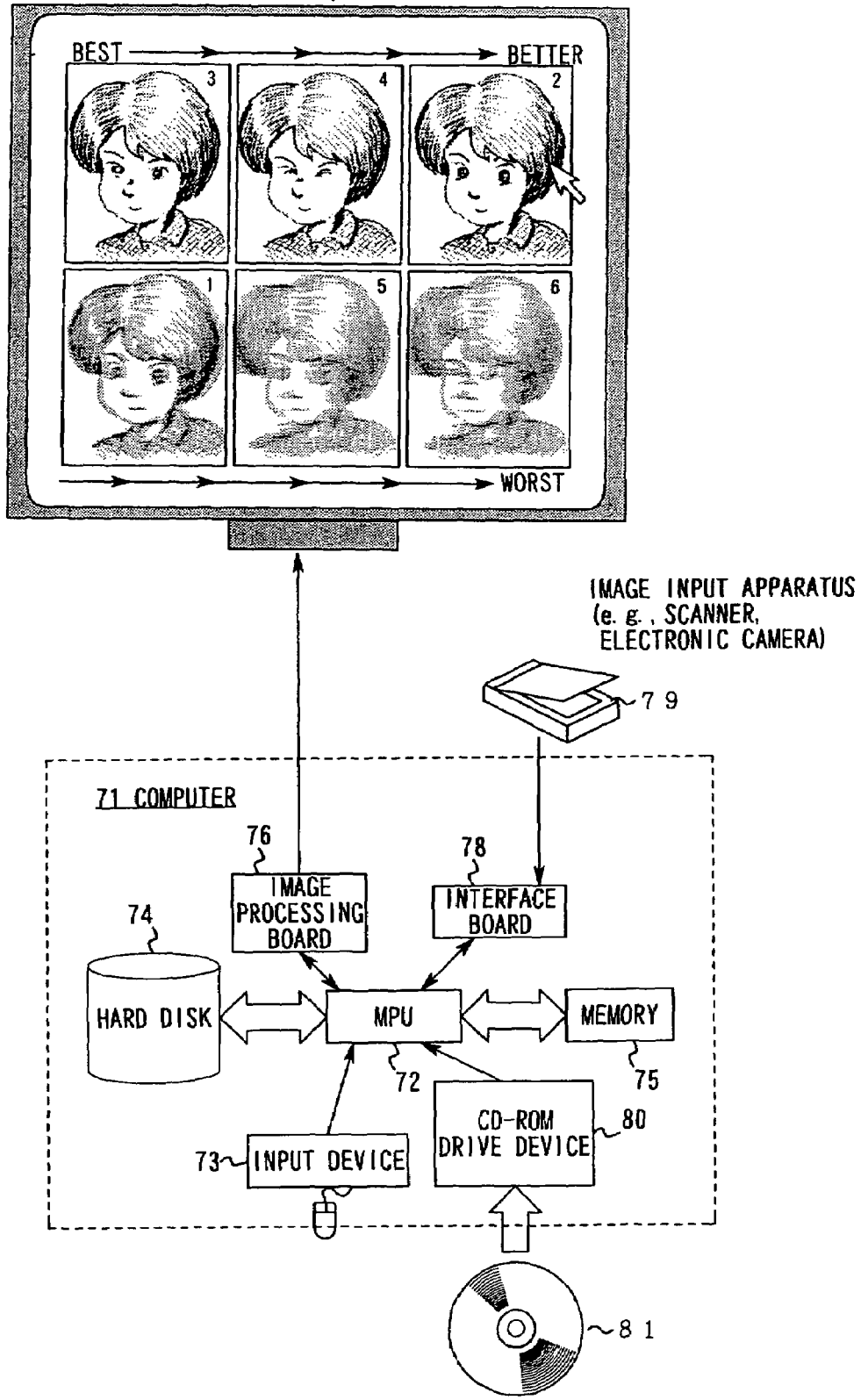
FIG. 15 illustrates the structure of the image selection system employing a computer achieved in a third embodiment.

In the third embodiment, a program in a recording medium is used to constitute an image selection system on a computer. FIG. 15 illustrates the configuration of an image selection system achieved by employing a computer 71.

In FIG. 15, a microprocessor 72 is provided in the computer 71. An input device 73 constituted of a keyboard, a mouse and the like, a hard disk 74, a memory 75, an image processing board 76 and an interface board 78 are connected to the microprocessor 72. A monitor 77 is connected to the image output terminal of the image processing board 76. An image input device 79 such as a scanner, an electronic camera or the like is connected to the interface board 78.

The microprocessor 72 is also connected with a CD ROM drive device 80. A CD ROM 81 having an image processing program and an installation program for installing the image processing program recorded therein is inserted at the C ROM drive device 80. Using the installation program in the CD ROM 81, the microprocessor 72 reads the image processing program in the CD ROM 81 and stores it in the hard disk 74 in an execution-enabled state.

Operation of the Third Embodiment

Figure 16:
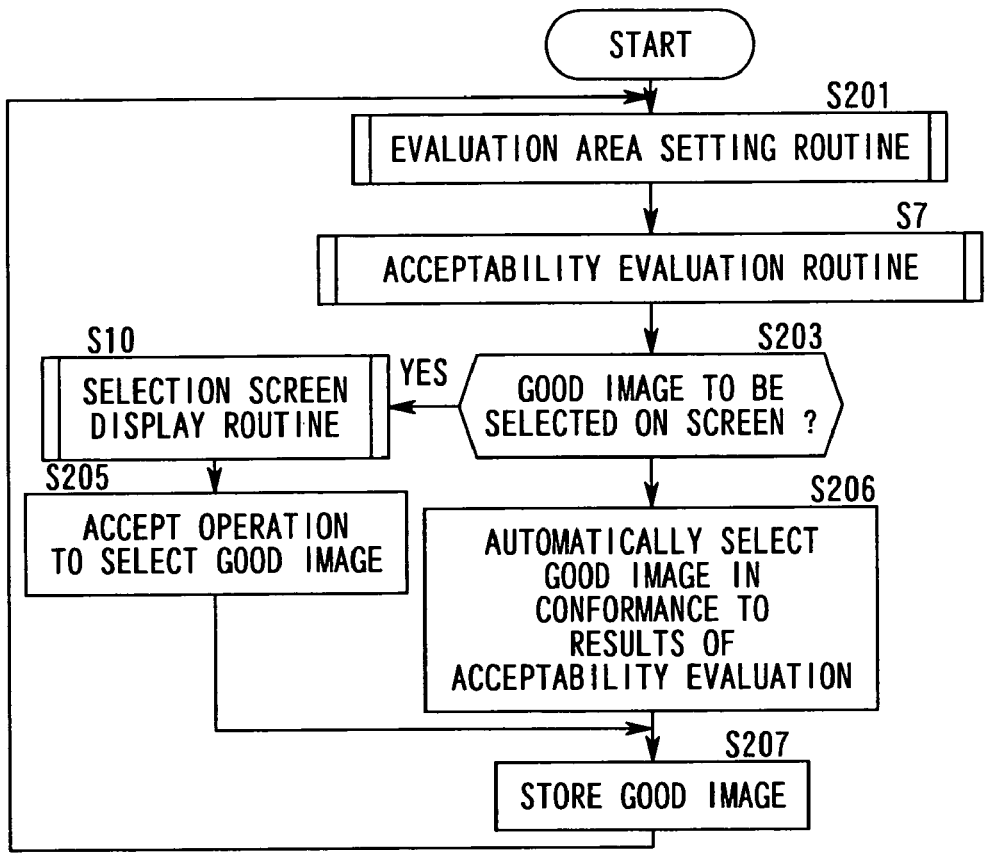
FIG. 16 illustrates the main routine implemented in the program.

FIG. 16 shows the main routine in the image processing program. On the computer 71, a plurality of sets of image data are first taken in via the image input apparatus 79 or another program and are stored in the hard disk 74 in advance. When the image processing program in FIG. 16 is executed in this state, the microprocessor 72 executes the evaluation area setting routine (step S201).

It is to be noted that if the computer 71 is connected with an electronic camera or the like and information pertaining to image-capturing (information such as the photometric area, the focal point detection area, whether or not an AE lock is in effect, whether or not an AF lock is in effect, the photometric value and the focus-verified area) is available, any of the setting routines presented in FIGS. 3A~3D and FIG. 4 illustrating the first embodiment can be executed. If, on the other hand, such information pertaining to image-capturing cannot be obtained, evaluation area range setting by the user may be accepted via the input device 73, such as a mouse.

Figure 17:
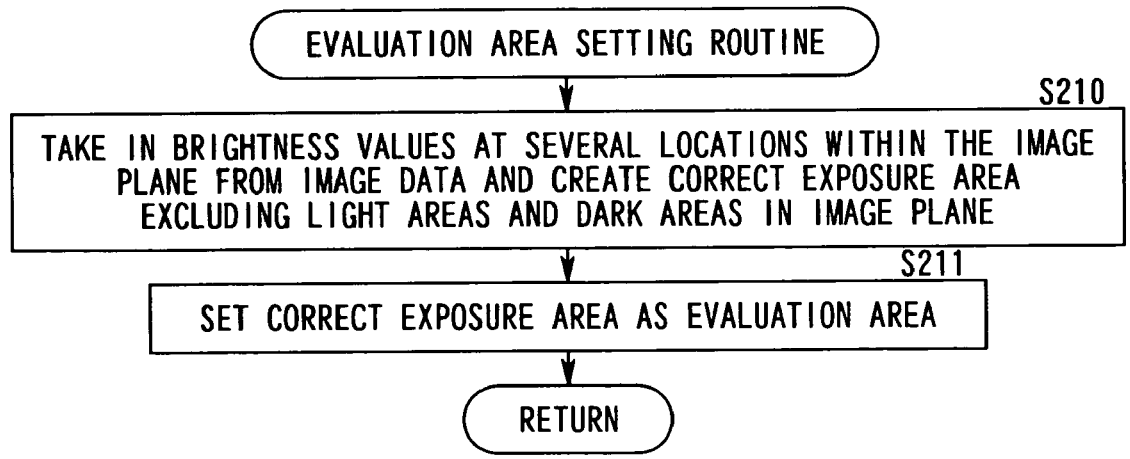
FIG. 17 illustrates the routine for setting evaluation areas.

In addition, by executing the setting routine presented in FIG. 17, an evaluation area can be automatically set. In is FIG. 17, the microprocessor 72 first takes in the brightness information in the image data. Based upon the brightness information, the microprocessor 72 excludes extremely light areas and extremely dark areas in the image plane and creates an appropriate exposure area (step S210). Next, the microprocessor 72 sets this appropriate exposure area as an evaluation area (step S211). After executing one of the setting routines described earlier, the microprocessor 72 executes the acceptability evaluation routine (FIG. 7) explained earlier in reference to the first embodiment to sequentially execute acceptability evaluation on the plurality of sets of image data (step S7).

Next, the microprocessor 18 makes a decision with regard to the conditions set by the user and determines whether or not a good image is to be selected on the screen (step S203). At this point, if the user has already selected the operating conditions for selecting an image on the screen (step S203 YES), the microprocessor 18 executes the selection screen display routine (see FIG. 8) explained earlier in reference to the first embodiment and brings up the "thumbnail display of image data obtained through continuous image-capturing" and the "rankings in the acceptability evaluation" overlapping each other on the monitor 77 (step S10).

The user manually selects one set of the image data on the monitor 77 as a good image by, for instance, operating the input device 73 (step 8205). After accepting the manual selection of the good image, the microprocessor 18 shifts its operation to step S207. If, on the other hand, it is decided in step S203 that the setting conditions for automatically selecting an image have been selected (step S203 NO), the microprocessor 18 selects the set of image data ranked first in the acceptability evaluation as a good image (step S206).

The microprocessor 72 stores the good image selected in step S205 or step S206 in this manner on the hard disk 74 (step S207).

Through the series of operations described above, the operation of the image processing program executed by the computer 71 is completed.

Through the operations explained above, in the third embodiment, advantages similar to those achieved in the first and second embodiments are realized on the computer 71.

Additional Notes on the Embodiments

It is to be noted that while the spatial frequency component undergoes fine evaluation through an orthogonal transformation such as DCT conversion in the embodiments explained above, the present invention is not limited to this method. For instance, although the accuracy of acceptability evaluation is somewhat lowered, the high band component of the spatial frequency may be extracted from the image data within an evaluation area via a spatial frequency filter or the like of the known art to perform an acceptability evaluation on the image data based upon the quantity of the high band component.

In addition, while acceptability evaluation is performed based upon the spatial frequency component in the embodiments explained earlier, the present invention is not restricted to this method. For instance, although the clarity of the evaluation area setting range will be somewhat compromised, a camera vibration detection device such as an acceleration sensor may be provided at the camera unit to use the quantity of camera vibration detected by the camera vibration detection device for evaluation.

Furthermore, acceptability evaluation may be performed on image data by using the detail component quantity, the contrast quantity, the noise quantity, the gradation reproducibility, the focus matching degree during image-capturing, the degree of correctness of exposure, the color reproducibility, the degree of saturation and the like in the image data as criteria for the evaluation.

Moreover, while an area corresponding to a photometric area or a focal point detection area that is set in advance is set as an evaluation area in the embodiments explained earlier, the present invention is not restricted to this example. An evaluation area may be set in advance, instead and a photometric area or a focal point detection area may be determined in correspondence to the evaluation area.

While the shape and the size of an evaluation area and those of another type of area are matched in the embodiments explained above, the present invention is not restricted to this example. Since a satisfactory effect is achieved as long as the positions of these areas within the image plane correspond with each other under normal circumstances, it is not particularly essential to match the shapes and sizes of the areas as well.

It is to be noted that while continuous image-capturing operation is stopped at a point in time at which an evaluation value exceeds the relative maximum point (step S110) in the second embodiment, the present invention is not restricted to this example. For instance, the continuous image-capturing operation may be stopped based upon a decision that a sufficiently good image has been captured at a point in time at which an evaluation value has exceeded a specific upper limit value. Alternatively, the continuous image-capturing operation may be stopped based upon a decision that further continuation of the continuous image-capturing operation is meaningless at a point in time at which an evaluation value has become equal to or less than a specific lower limit value. Or, continuous image-capturing may be stopped at a point in time at which the number of frames in which images have been captured has exceeded a specific value.

In addition, the first embodiment, in which the image selection is executed after a continuous image-capturing operation is completed, achieves an advantage in that a continuous image-capturing operation can be performed at high speed. The second embodiment, in which image selection and overwrite storage are executed on a single image at a time while a continuous image-capturing operation is in progress, on the other hand, achieves an advance in that it is not necessary to temporarily store all the image data. Thus, an operation switching device may be provided to make a decision as to whether or not there is sufficient temporary storage capacity so that the high speed continuous image-capturing in the first embodiment is executed when there is a comfortable margin in terms of temporary storage capacity, whereas the second embodiment is adopted if there is no comfortable margin to ensure that temporary storage capacity is always available. Through such an operation of the operation switching device, the acceptability selection mode can be switched in a flexible manner for execution in correspondence to the number of remaining frames at the electronic camera and the like.

Furthermore, while the explanation is given in reference to the embodiments above on an example in which one set of image data among a plurality of sets of image data obtained through continuous image-capturing is selected and recorded, it is not necessary to limit the number of sets of image data for recording to one and two or more sets of image data may be recorded.

Fourth Embodiment

Figure 18:
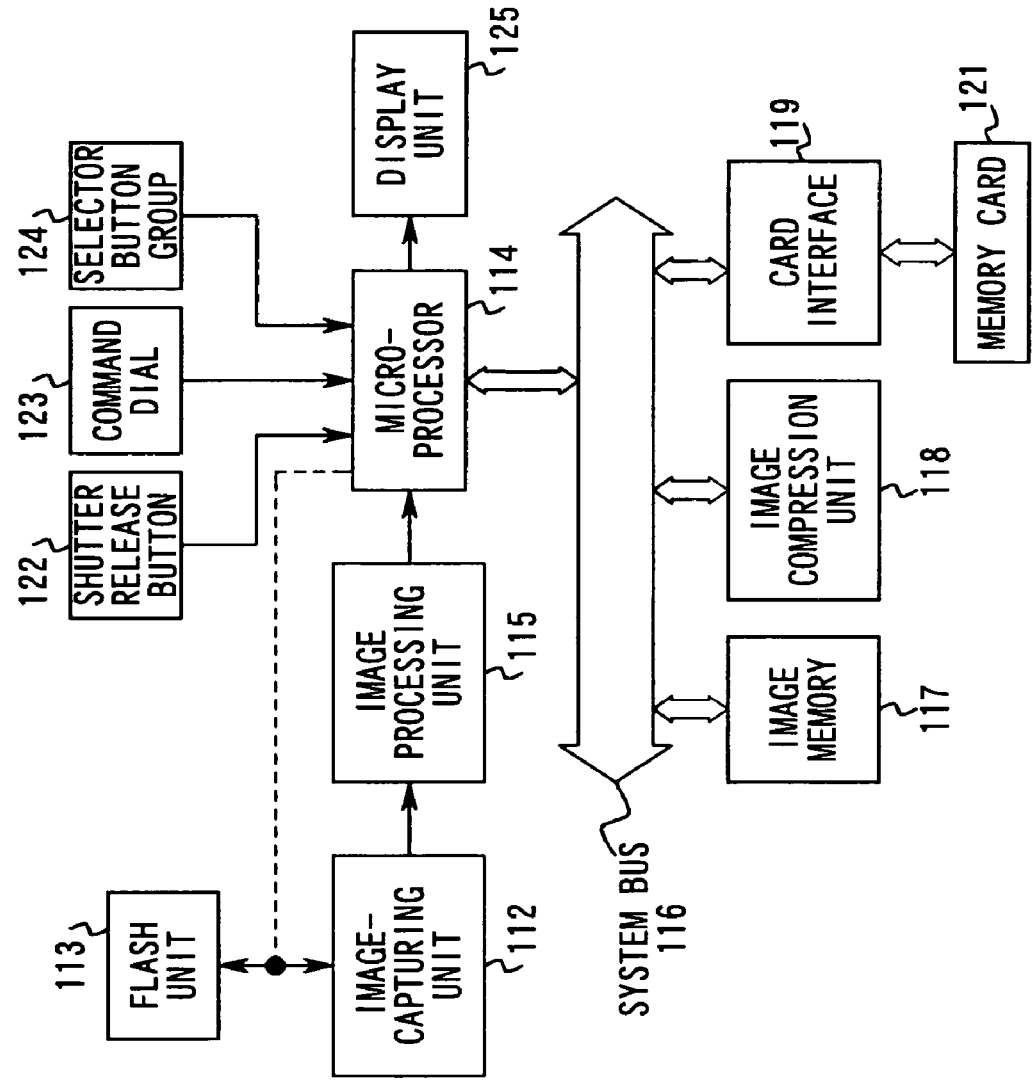
FIG. 18 is a block diagram illustrating the structure of the electronic camera in a fourth embodiment.
Figure 19:
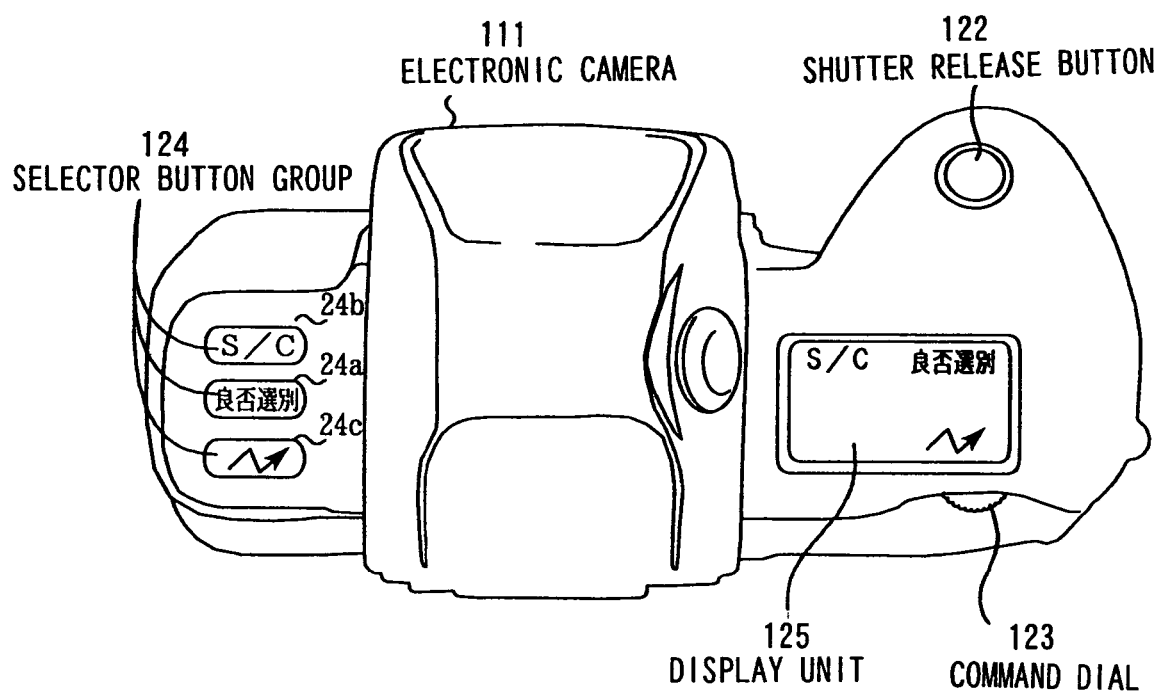
FIG. 19 is an external view illustrating the positions of the operating members in the electronic camera.

The following is an explanation of the fourth embodiment, given in reference to FIGS. 18 and 19. FIG. 19 is a block diagram illustrating the structure of an electronic camera 111. FIG. 19 is an external view of the electronic camera 111 illustrating the positions of its operating members.

An image-capturing unit 112 and an electronic flash unit 113 (a strobe) are provided at the electronic camera 111. The image-capturing unit 112 and the flash unit 113 are both provided with a control signal by a microprocessor 114 in the electronic camera 111. An image signal output from the image-capturing unit 112 is input to the microprocessor 114 via an image processing unit 115 where it undergoes gamma correction and A/D conversion. The microprocessor 114 is connected with an image memory 117, an image compression unit 118, a card interface 119 and the like via a system bus 116, and a display unit 125 directly.

At the upper surface of the casing of the electronic camera 111, operating members such as a shutter release button 122, a command dial 123 and a selector button group 124 are provided. Switch signals from these operating members are taken into the microprocessor 114.

(Operation of the Fourth Embodiment)

The following is an explanation of the operation performed in the fourth embodiment.

Figure 20:
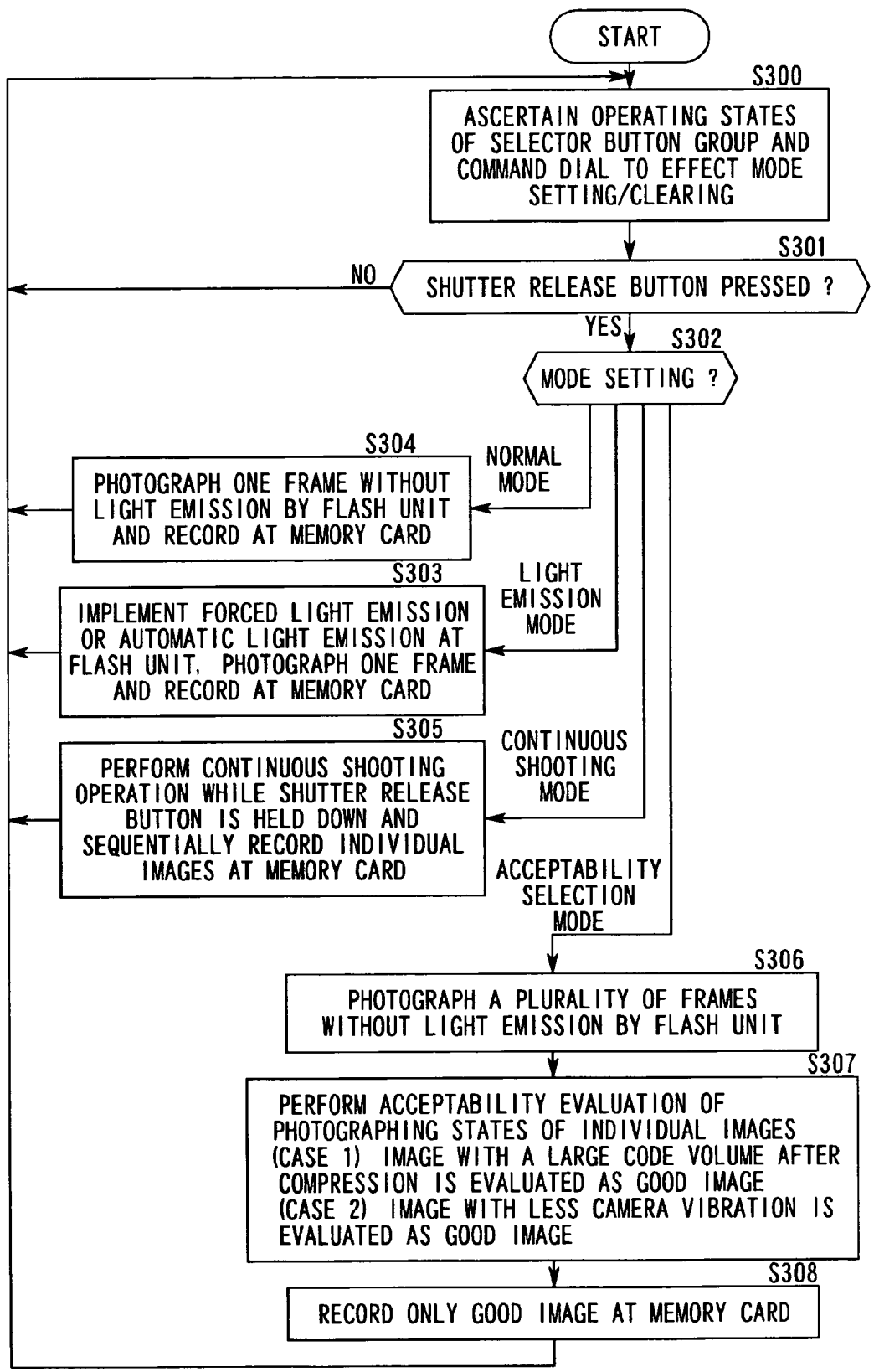
FIG. 20 is a flowchart illustrating the operation of the microprocessor in the fourth embodiment.

FIG. 20 is a flowchart of the operation performed by the microprocessor 114. First, the microprocessor 114 takes in an external mode selection operation performed by the photographer via the selector button group 124 and the command dial 123. The external operation performed at this point may be one of the following (D1)–(D3) below, for instance.

(D1) Setting/Clearing the Acceptability Selection Mode:

The photographer selectively presses an acceptability selection button 124a in the selector button group 124. He turns the command dial 123 in this state to alternately set/clear the acceptability selection mode.

(D2) Setting/Clearing of the Continuous Shooting Mode:

The photographer selectively presses an S/C button 124b in the selector button group 124. He turns the command dial 123 in this state to alternately set/clear the continuous shooting mode.

(D3) Setting/Clearing of the Light Emission Mode:

The photographer selects and presses a flash mark button 124c in the selector button group 124. He turns the command dial 123 in this state to alternately set/clear the light emission mode.

In response to such an external operation, the microprocessor 114 changes the mode setting at the electronic camera 111 (FIG. 20 S300).

Figure 21:
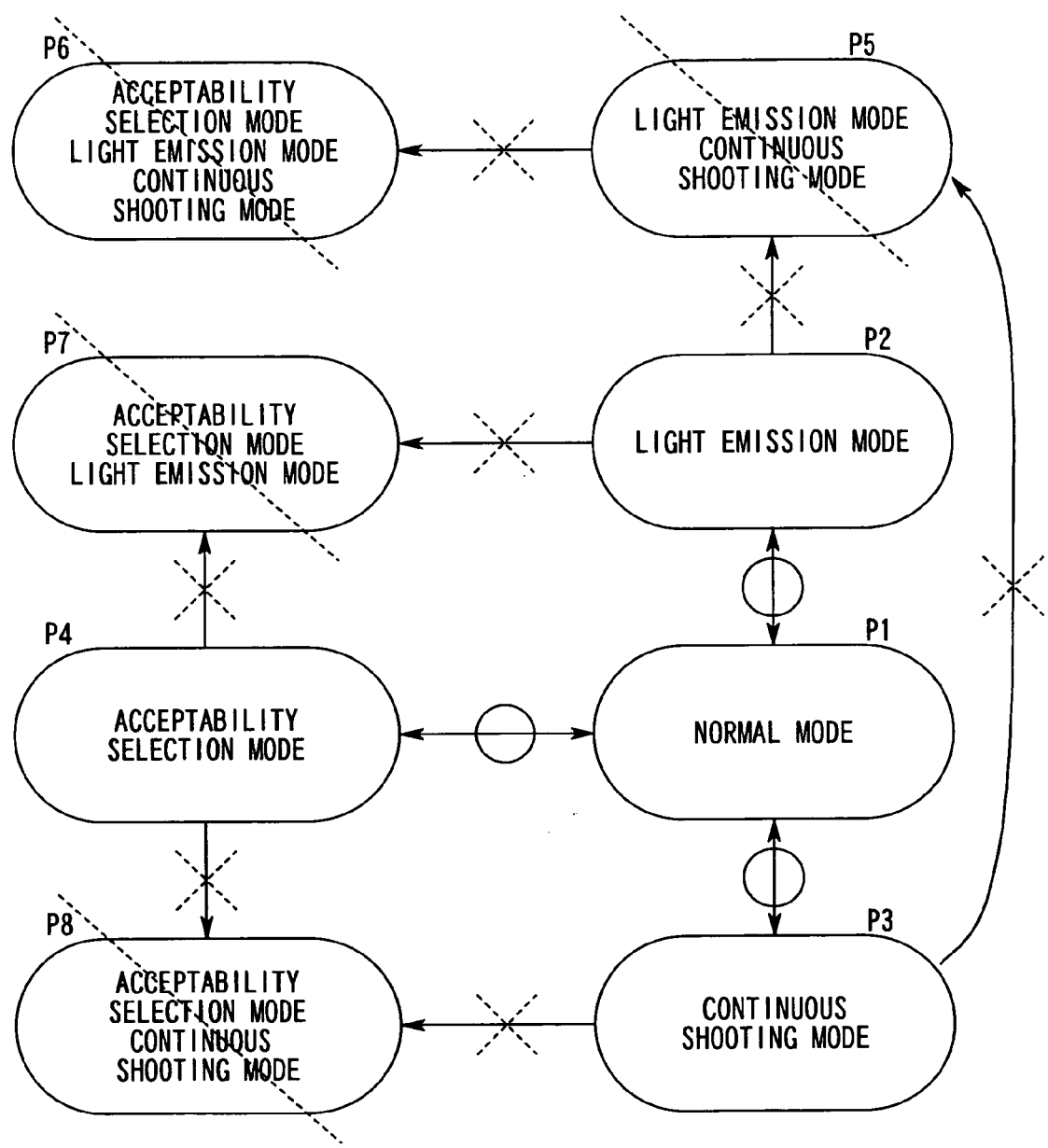
FIG. 21 is a state transition diagram illustrating changes in the mode setting in the fourth embodiment.

FIG. 21 is a state transition diagram illustrating in detail the mode setting changes effected through this process, As illustrated in FIG. 21, there are 8 different types of mode states P1–P8 listed below depending upon how the three types of modes (light emission mode, continuous shooting mode, acceptability selection mode) are combined.

P1 normal mode (non-light emission mode and single shot mode and non-acceptability selection mode)
P2 light emission mode
P3 continuous shooting mode
P4 acceptability selection mode
P5 light emission mode, continuous shooting mode
P6 acceptability selection mode, light emission mode, continuous shooting mode
P7 acceptability selection mode, light emission mode
P8 acceptability selection mode, continuous shooting mode In the mode states P1–P4, no problems attributable to a plurality of modes used at the same time occur. Thus, the microprocessor 114 directly accepts an external mode selection operation performed by the photographer to change the mode within the range of the states P1–P4 and executes a mode setting change (the state transitions marked with circles in FIG. 21). At this point, the microprocessor 114 notifies the photographer that a mode setting change has been executed through mode display on the display unit 25.

In the other mode states P5–P8, on the other hand, at least two modes among the three types of modes (the light emission mode, the continuous shooting mode, the acceptability selection mode) may be set concurrently and problems attributable to using a plurality of modes at the same time are expected to occur. In order to prevent these problems, the microprocessor 114 does not accept any external mode selection operation that would cause a transition to any of the states P5–P8 (the state transitions marked with crosses in FIG. 21). At this time, the microprocessor 114 issues a warning indicating that the mode change is not accepted via the display unit 125, a buzzer or the like. The microprocessor 114 repeatedly executes the series of setting operations described above until the shutter release button 122 is pressed (FIG. 20, S301 NO).

If the shutter release button 122 is pressed in such a state (FIG. 20, S301 YES), the microprocessor 114 selects the photographing sequence that corresponds to the current mode setting (FIG. 20, S302). In conformance to the photographing sequence thus selected, the microprocessor 114 implements control on the image-capturing unit 112 or the flash unit 113 to perform photographing.

In other words, in the normal mode, the microprocessor 114 implements control on the image-capturing unit 112 to perform photographing for one frame (FIG. 20, S303). In the light emission mode, the microprocessor 114 implements control on the flash unit 113 and the image-capturing unit 112 to perform flash photographing for one frame (FIG. 20, S304). In the continuous shooting mode, the microprocessor 114 implements control on the image-capturing unit 112 to perform a continuous shooting operation (FIG. 20, S305).

In addition, if the acceptability selection mode has been set, the microprocessor 114 first implements control on the image-capturing unit 112 to photograph images corresponding to a plurality of frames (FIG. 20, S306). Next, the microprocessor 114 performs acceptability evaluation in regard to the photographing states of the individual images. In this example, an image with a greater post-compression code volume is evaluated as a good image (FIG. 20, S307). The microprocessor 114 records only the good image rated high in the evaluation at a memory card 121 via the card interface 119 (FIG. 20, S308).

After completing the photographing sequence corresponding to each mode once as described above, the microprocessor 114 returns to the operation in step S300.

Through the operations described above, image data obtained in a good photographing state are selected from image data obtained through continuous image-capturing and are recorded in the acceptability selection mode in the fourth embodiment. Thus, image data achieved through a good photographing state can be obtained without having to employ any type of camera vibration correction mechanism of the prior art.

In addition, in the fourth embodiment, the acceptability selection mode, the continuous shooting mode and the light emission mode are prevented from being set in combination with a high degree of reliability. Consequently, any problems attributable to using these modes together can be prevented.

In particular, any external operation that would cause problems is not accepted at the point in time at which the external operation is attempted by the photographer. This prompts awareness on the part of the photographer that these modes cannot be used together.

Fifth Embodiment

Since the structure and the photographing sequences of the fifth embodiment are identical to those of the fourth embodiment (see FIG. 18 and FIG. 20), their explanation is omitted.

Figure 22:
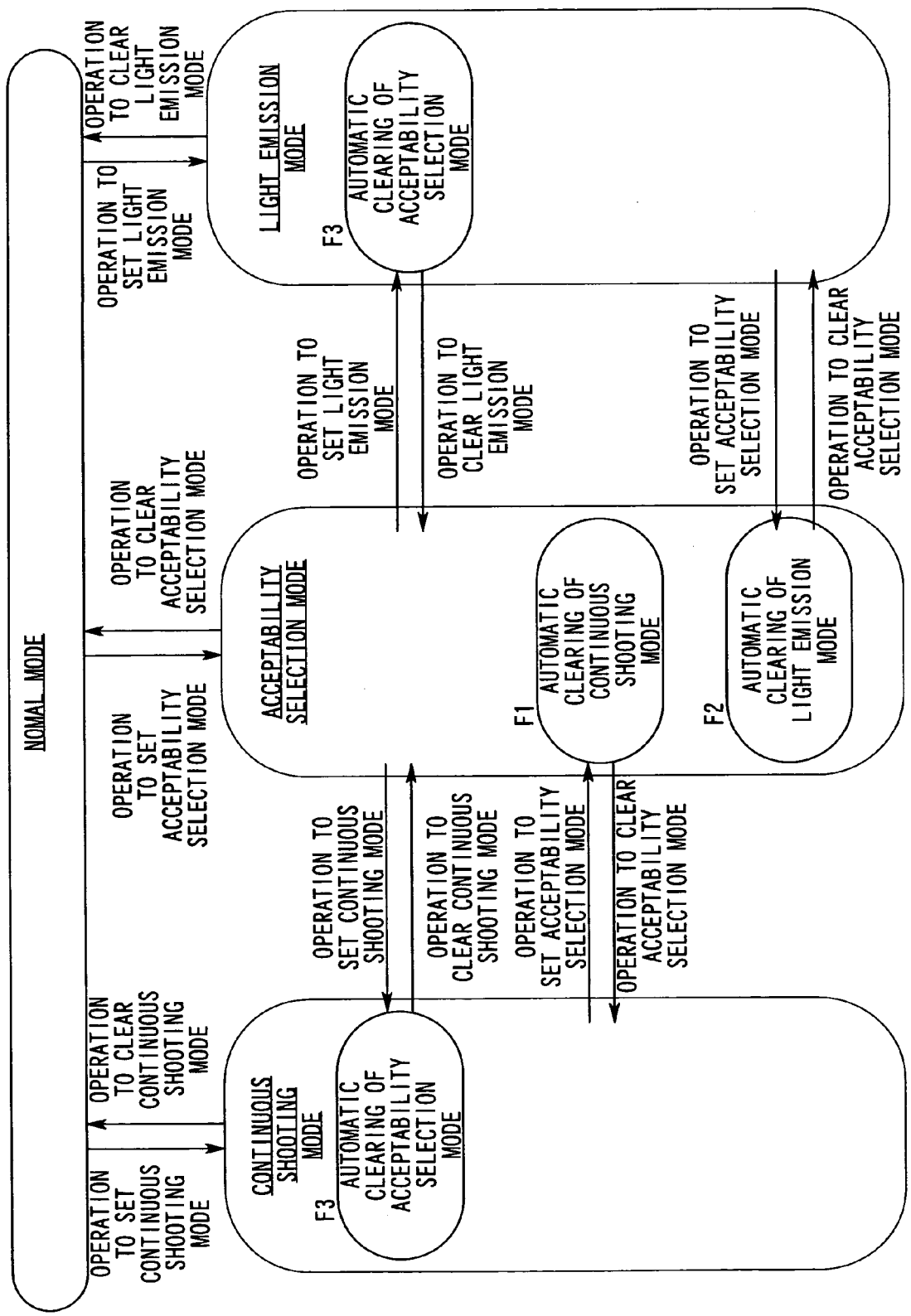
FIG. 22 is a state transition diagram illustrating changes in the mode setting in a fifth embodiment.

FIG. 22 is a state transition diagram illustrating mode setting changes effected by the microprocessor 114. It is to be noted that the illustration of the state transitions occurring between the continuous shooting mode and the light emission mode are omitted in FIG. 22 to simplify the explanation of the invention. As illustrated in FIG. 22, flags F1–F3 for storing the mode history are provided in advance on the internal memory of the microprocessor 114. When one of the flags F1–F3 is set, it indicates the following mode history.

F1: The continuous shooting mode has been previously cleared automatically

F2: The light emission mode has been previously cleared automatically

F3: The acceptability selection mode has been previously cleared automatically

The following is an explanation of specific mode setting change operations performed in specific situations (E1)–(E8).

(E1: The Normal Mode is Set)

When the main power is turned on at the electronic camera 111, the microprocessor 114 selects the normal mode as an initial state. It is to be noted that the normal mode corresponds to a state in which the non-light emission mode, the single shot mode and the non-acceptability selection mode are set.

In the state in which the normal mode is selected, the microprocessor 114 resets the flags F1–F3 to erase the past mode history. If the photographer performs a setting operation to select any one of the light emission mode, the continuous shooting mode and the acceptability selection mode while the normal mode is set, the microprocessor 114 effects a setting change to shift to the desired mode.

(E2: In a State in Which the Acceptability Selection Mode is Set, an External Operation is Performed to Select the Continuous Shooting Mode)

If the photographer performs a setting operation to select the continuous shooting mode while the acceptability selection mode is set, the microprocessor 114 automatically clears the acceptability selection mode that is currently selected and then effects a setting change to select the continuous shooting mode. Concurrently with such a setting change, the microprocessor 114 sets the flag F3 and stores the "automatic clearing of the acceptability selection mode." In addition, the microprocessor 114 resets the other flags F1 and F2 to erase other unnecessary mode histories.

(E3: In a State in Which the Acceptability Selection Mode is Set, an External Operation is Performed to Select the Light Emission Mode)

If the photographer performs a setting operation to select the light emission mode while the acceptability selection mode is set, the microprocessor 114 automatically clears the acceptability selection mode that is currently selected and then effects a setting change to select the light emission mode. Concurrently with such a setting change, the microprocessor 114 sets the flag F3 and stores the "automatic clearing of the acceptability selection mode." In addition, the microprocessor 114 resets the other flags F1 and P2 to erase other unnecessary mode histories.

(E4: In a State in Which the Acceptability Selection Mode is Set, an Operation is Performed to Clear the Acceptability Selection Mode)

If the photographer performs an operation to clear the acceptability selection mode while the acceptability selection mode is set, the microprocessor 114 makes a decision with regard to the states of the flags F1 and F2. At this point, if the flags F1 and F2 are both determined to be in a reset state, the microprocessor 114 clears the acceptability selection mode and effects a setting change to select the normal mode.

If, on the other hand, the flag F1 is determined to be in a set state, the microprocessor 114 clears the acceptability selection mode and resets the flag F1 before effecting a setting change (recovery) to select the continuous shooting mode. If the flag F2 is determined to be in a set state, the microprocessor 114 clears the acceptability selection mode and resets the flag F2 before effecting a setting change (recovery) to select the light emission mode.

(E5: In a State in Which the Continuous Shooting Mode is Set, a Setting Operation is Performed to Select the Acceptability Selection Mode)

If the photographer performs a setting operation to select the acceptability selection mode while the continuous shooting mode is set, the microprocessor 114 automatically clears the continuous shooting mode that is currently selected and then effects a setting change to select the acceptability selection mode. Concurrently with such a setting change, the microprocessor 114 sets the flag F1 to store the "automatic clearing of the continuous shooting mode." In addition, the microprocessor 114 resets the other flags F2 and P3 to erase other unnecessary mode histories.

(E6: In a State in Which the Continuous Shooting Mode is Set, an Operation is Performed to Clear the Continuous Shooting Mode)

If the photographer performs an operation to clear the continuous shooting mode while the continuous shooting mode is set, the microprocessor 114 makes a decision with regard to the state of the flag F3. At this point, if the flag F3 is determined to be in a reset state, the microprocessor 114 clears the continuous shooting mode and effects a setting change to select the normal mode. If, on the other hand, the flag F3 is determined to be in a set state, the microprocessor 114 clears the continuous shooting mode and resets the flag F3 before effecting-a setting change (recovery) to select the acceptability selection mode.

(E7: In a State in Which the Light Emission Mode is Set, a Setting Operation is Performed to Select the Acceptability Selection Mode)

If the photographer performs a setting operation to select the acceptability selection mode while the light emission mode is set, the microprocessor 114 automatically clears the light emission mode that is currently selected and then effects a setting change to select the acceptability selection mode. Concurrently with such a setting change, the microprocessor 114 sets the flag 72 to store the "automatic clearing of the light emission mode." In addition, the microprocessor 114 resets the other flags F1 and F3 to erase other unnecessary mode histories.

(E8: In a State in Which the Light Emission Mode is Set, an Operation is Performed to Clear the Light Emission Mode)

If the photographer performs an operation to clear the light emission mode while the light emission mode is set, the microprocessor 114 makes a decision with regard to the state of the flag F3. At this point, if the flag F3 is determined to be in a reset state, the microprocessor 114 clears the light emission mode and effects a setting change to select the normal mode. If, on the other hand, the flag F3 is determined to be in a set state, the microprocessor 114 clears the light emission mode and resets the flag F3 before effecting a setting change (recovery) to select the acceptability selection mode.

In the fifth embodiment, too, by performing the operations described above, the acceptability selection mode, the continuous shooting mode and the light emission mode can be prevented from being used at the same time with a high degree of reliability, thus, any problems attributable to these modes being set concurrently can be prevented.

In particular, in the fifth embodiment, priority is given to a mode to be set anew and the mode that has been previously set is automatically cleared. Thus, the most recent photographing intention of the photographer can be reflected in the mode setting of the electronic camera 111 with a high degree of accuracy. In addition, it is not necessary for the photographer to go to the trouble of clearing the unwanted mode set previously in this situation. As a result, the operability in mode setting is further improved.

Furthermore, in the fifth embodiment, when problems attributable to using a plurality of modes at the same time are eliminated in response to a photographer operation, the previous mode is automatically restored. Thus, it is not necessary for the photographer to consciously reverse the automatic clearing of the mode that has been unilaterally effected by the electronic camera 111, thereby achieving a further improvement in the operability in mode setting.

Sixth Embodiment

Since the structure of the sixth embodiment is identical to that adopted in the fourth embodiment (see FIG. 18) except for the internal program at the microprocessor 114, the explanation of its structural features is omitted.

Figure 23:
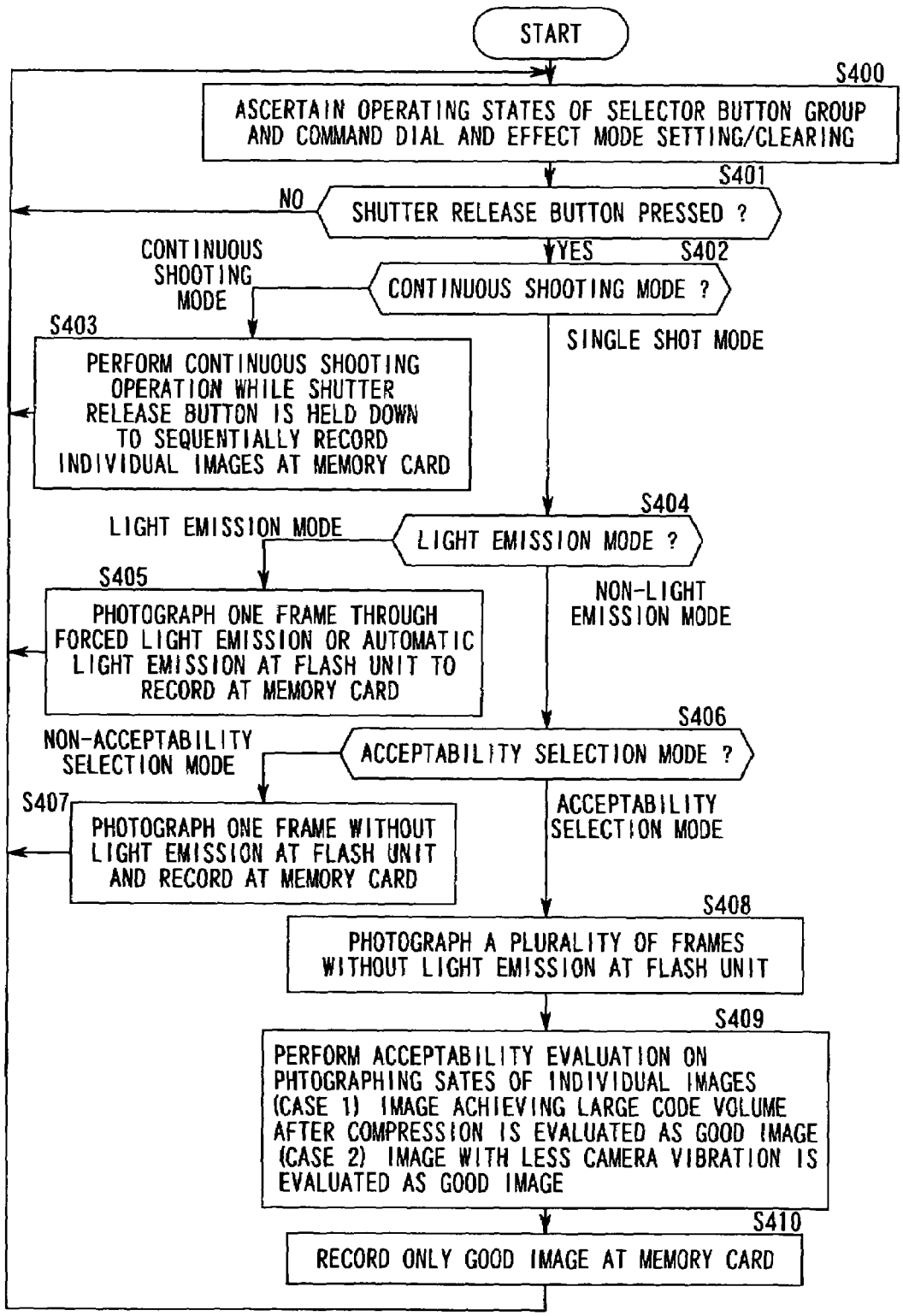
FIG. 23 is a flowchart illustrating the operation of the microprocessor in a sixth embodiment.

FIG. 23 is a flowchart of the operation performed by the microprocessor 114. The following is an explanation of the operation performed in the sixth embodiment given in reference to FIG. 23. The microprocessor 114 first obtains the switch states of the selector button group 124 and the command dial 123, and directly proceeds to execute mode setting/clearing (FIG. 23, S400). It is to be noted that unlike in the fourth and fifth embodiments explained earlier, multiple mode setting is not specially avoided in the sixth embodiment.

The microprocessor 114 repeatedly executes the mode setting/clearing until the shutter release button 122 is pressed (FIG. 23, S401 NO). If the shutter release button 122 is pressed during such repeated operation (FIG. 23, S401 YES), the microprocessor 114 first makes a decision as to whether or not the continuous shooting mode is currently set (FIG. 23, S402). If it is decided that the continuous shooting mode is currently set, the microprocessor 114 executes a continuous shooting operation regardless of any other operating modes that may be set (FIG. 23, S403).

If, on the other hand, the single shot mode is currently set, the microprocessor 114 makes a decision as to whether or not the light emission mode is currently set (FIG. 23, S404). If it is decided that the light emission mode is currently set, the microprocessor 114 executes a flash photographing operation regardless of any other operating modes that may be set (FIG. 23, S405).

If, on the other hand, the non-light emission mode is currently set, the microprocessor 114 makes a decision as to whether or not the acceptability selection mode is currently set (FIG. 23, S406). If it is decided that the non-acceptability selection mode is currently set, the microprocessor 114 executes a photographing operation in the normal mode (FIG. 23, S407). If the acceptability selection mode is currently set, the microprocessor 114 executes a photographing operation in the acceptability selection mode (FIG. 23, S408–S410). After completing the photographing sequence corresponding to a given mode as described above once the microprocessor 114 returns to the operation in step S400.

Through the operations described above, the microprocessor 114 gives priority to the photographing sequence in the continuous shooting mode (FIG. 23, S403) for execution if the continuous shooting mode and another mode are set concurrently in the sixth embodiment. In addition, the microprocessor 114 gives priority to the photographing sequence in the light emission (FIG. 23, S405) for execution if the light emission mode and the acceptability selection mode are set concurrently in the sixth embodiment.

Consequently, concurrent use of a plurality of modes can be avoided with a high degree of reliability in the sixth embodiment in which the modes can be set at the same time. Thus, any problems attributable to using these modes at the same time can be prevented.

It is to be noted that in the fourth through sixth embodiments described above, a good image is selected based upon the post-compression code volume in the acceptability selection mode. However, the operation that may be performed in the acceptability selection mode according to the present invention is not restricted to this example. Generally speaking, any operation in which acceptability evaluation is performed on the photographing states of images and through which a good image is selected based upon the acceptability evaluation will achieve the advantages of the present invention.

For instance, as described in detail in the specification of Japanese Patent Application No. H10-236102, an image with the least amount of blur can be selected as a good image by detecting the quantities of camera vibration occurring at the electronic camera during photographing with an acceleration sensor or the like. In addition, in the acceptability selection mode according to the present invention, acceptability evaluation does not need to be performed by using a single criterion and acceptability evaluation may be executed by using a plurality of criteria to achieve an integrated acceptability evaluation based upon these criteria.

In addition, while the explanation is given in reference to the first and second embodiments and the fourth through sixth embodiments on an example in which the system is constituted of a single unit electronic camera, the present invention is not restricted to this structure. For instance, the electronic camera in any of these embodiments may be constituted as a system comprising separate units such as an image-capturing unit and an information processing unit (including a computer, a palm-size electronic notepad and the like). In such a case, a program for executing the flow of the operation in each of the embodiments may be provided on a recording medium such as a CD ROM so that the program can be installed at the information processing unit for execution. The recording medium may be constituted by using any of various types of recording media including a memory card, a floppy disk, a magnetic tape and a DVD. It goes without saying that the program may instead be stored in advance in the ROM or the hard disk of the information processing unit.

Alternatively, the program may be provided via a communication medium such as a transmission line, a typical example of which is the internet. Namely, the programs may be converted to signals on a carrier wave that is transmitted on a transmission medium, and transmitted.

Figure 24:
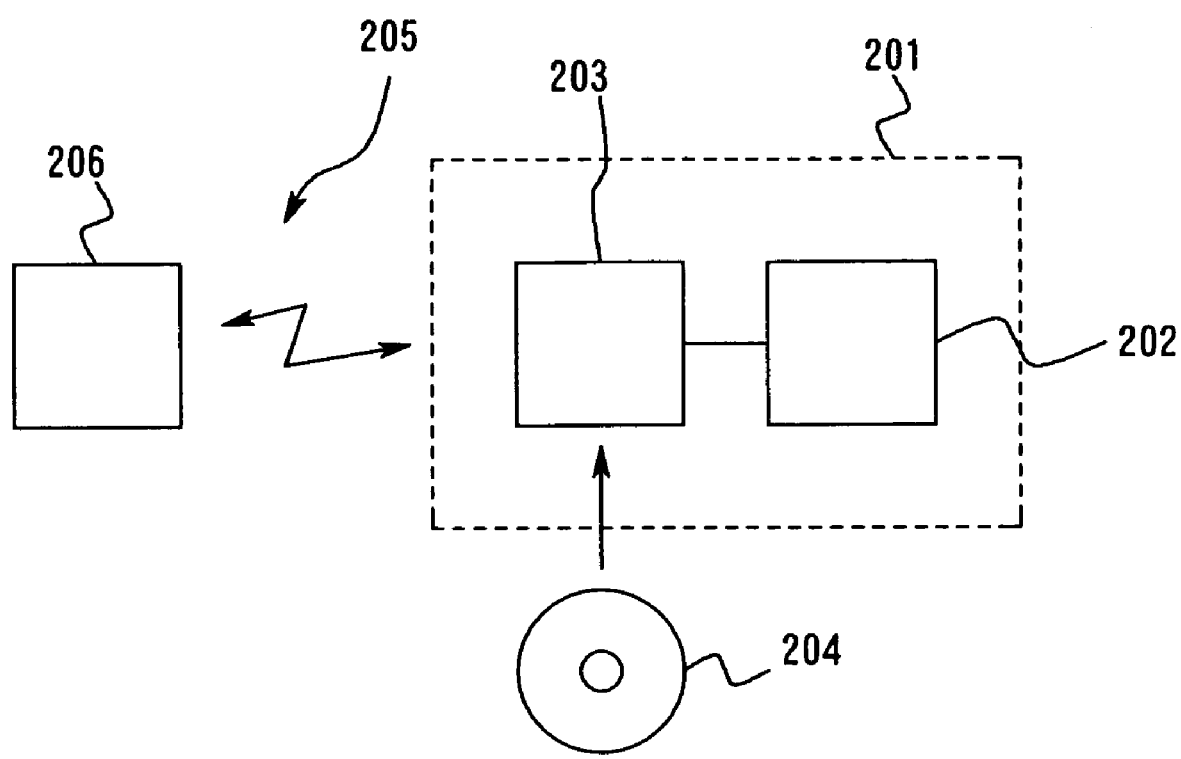
FIG. 24 illustrates how a program maybe provided through a telecommunication line.
Figure 25:
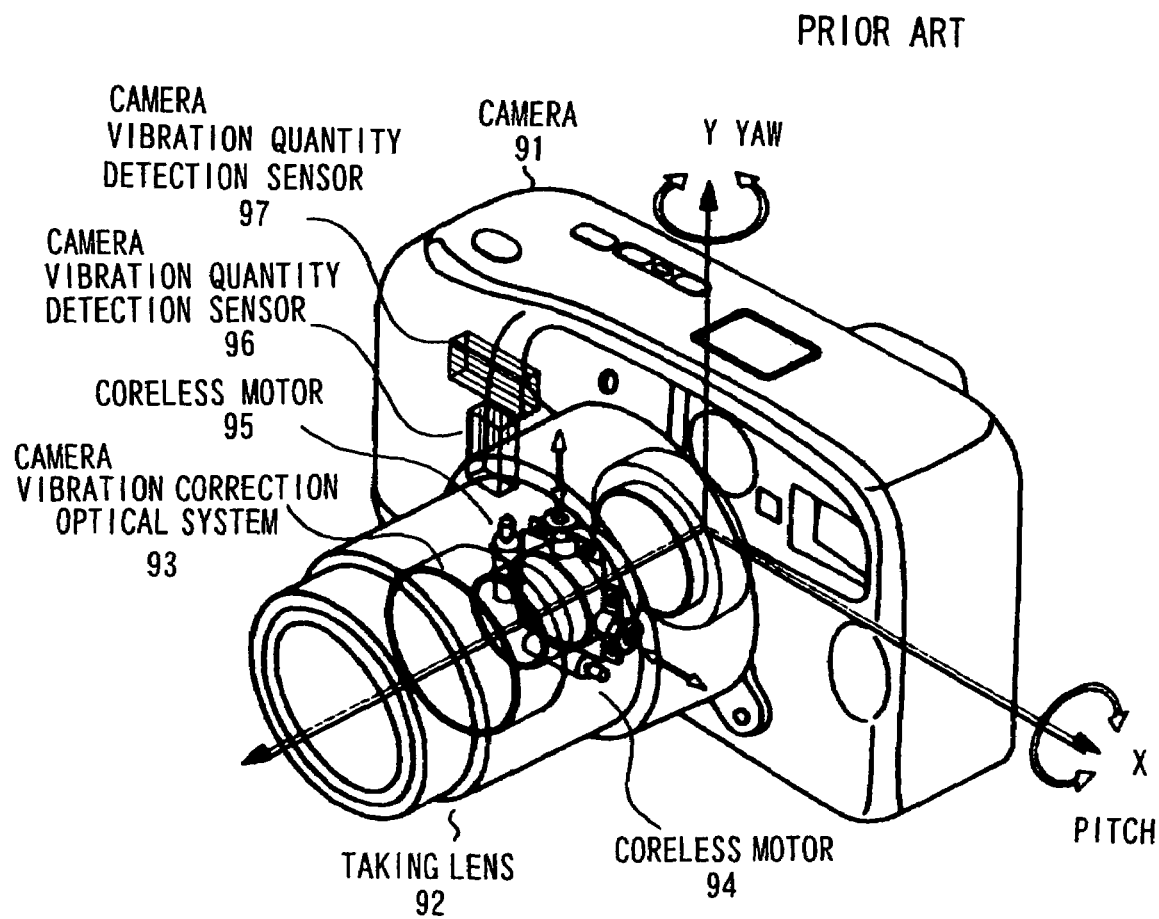
FIG. 25 illustrates a camera having a camera vibration correction mechanism in the prior art.

FIG. 24 illustrates a configuration through which the program is provided in this manner. An electronic camera 201 is constituted of separate units, i.e., an image-capturing unit 202 and an information processing unit 203, as described above. The information processing unit 203, which is provided with a CD ROM drive device, is capable of receiving programs provided on a CD ROM. In addition, the information processing unit 203, which has a function of connecting with a telecommunication line 205, is capable of receiving programs provided via the internet or the like. The programs described above are stored in a computer 206, which functions as a server computer. i.e., the provider of the program. The telecommunication line 205 may be a telecommunication line for an internet connection, telecomputing service or the like or a dedicated telecommunication line. The telecommunication line 205 may be a telephone line, a wireless telephone line, a mobile telephone line or the like. In addition, the program executed by the computer 71 in FIG. 15 illustrating the third embodiment, too, may be provided through the internet or the like.

It is to be noted that in the electronic camera adopting the single, integrated-unit structure in the first embodiment, the control program according to the present invention executed in the electronic camera are normally installed in a ROM or the like during the production stage. However, the ROM in which the control program is installed may be a writable ROM which is connected to a computer by adopting a structure similar to that illustrated in FIG. 15 so that program revisions can be provided from a recording medium such as a CD ROM via the computer. In addition, a revised program may be provided via the internet or the like as described above.

What is claimed is:

1. An image processing apparatus having an image selecting function, comprising:
    a compression device that engages in compression processing on a set of image data;
    an evaluation device that controls said compression device to compress a plurality of sets of image data, each set of which has been continuously obtained through an image-capturing operation with an image-capturing device, by using a compression parameter for acceptability evaluation, and performs acceptability evaluation on each set of image data based upon a resulting post-compression code volume; and
    an acceptability selection device that selects a set of image data ranked high in the acceptability evaluation among the plurality of sets of image data having undergone the acceptability evaluation at said evaluation device, and records the selected set of image data into a recording medium in a state in which the selected set of image data is compressed via said compression device to achieve a target post-compression code volume for image recording.

2. An image processing apparatus according to claim 1, wherein:
    said acceptability selection device makes a decision as to whether or not the post-compression code volume of the set of image data that has been selected, achieved in the acceptability evaluation is within an allowable range for a target post-compression code volume for image recording, and records compressed data resulting from the acceptability evaluation if the post-compression code volume is within the allowable range, but re-compresses the set of image data that has been selected to achieve the target post-compression volume for image recording and records the re-compressed image data if the post-compression code volume is not within the allowable range.

3. An image processing apparatus according to claim 1, wherein:
    said compression device determines a compression parameter to be used for re-compression to achieve the target post-compression code volume for image recording based upon results of the compression processing performed during the acceptability evaluation.

* * * * *

UNITED STATES PATENT AND TRADEMARK OFFICE
CERTIFICATE OF CORRECTION

| | |
|---|---|
| PATENT NO. | : 7,088,865 B2 |
| APPLICATION NO. | : 11/042068 |
| DATED | : August 8, 2006 |
| INVENTOR(S) | : Satoshi Ejima, Hirotake Nozaki and Fumio Hiraide |

Page 1 of 1

It is certified that error appears in the above-identified patent and that said Letters Patent is hereby corrected as shown below:

On Title Page, Item (30)   Foreign Application Priority Data, should read,

Nov. 20, 1998   (JP)   ……………. --10-331367--

Jan. 18, 1999   (JP)   ……………. 11-9077

Jan. 18, 1999   (JP)   ……………. 11-9078

Jan. 18, 1999   (JP)   ……………. 11-9079

Jan. 18, 1999   (JP)   ……………. 11-9080

Signed and Sealed this

Twenty-first Day of November, 2006

JON W. DUDAS
*Director of the United States Patent and Trademark Office*